US006886611B2

(12) United States Patent
Dupont et al.

(10) Patent No.: US 6,886,611 B2
(45) Date of Patent: May 3, 2005

(54) SYSTEM FOR TRANSFERRING A FLUID PRODUCT BETWEEN A CARRYING VESSEL AND A SHORE INSTALLATION

(75) Inventors: Bernard Dupont, Eaubonne (FR); Stéphane Paquet, Paris (FR)

(73) Assignee: Societe Europeenne d'Ingenierie Mecanioue-Eurodim, Rueil Malmaison (FR)

( * ) Notice: Subject to any disclaimer, the term of this patent is extended or adjusted under 35 U.S.C. 154(b) by 0 days.

(21) Appl. No.: 10/398,370

(22) PCT Filed: Sep. 11, 2001

(86) PCT No.: PCT/FR01/02827

§ 371 (c)(1),
(2), (4) Date: Aug. 1, 2003

(87) PCT Pub. No.: WO02/28765

PCT Pub. Date: Apr. 11, 2002

(65) Prior Publication Data

US 2004/0011424 A1 Jan. 22, 2004

(30) Foreign Application Priority Data

Oct. 6, 2000 (FR) ........................................... 00 12842

(51) Int. Cl.$^7$ ................................................ B65G 57/60

(52) U.S. Cl. ..................... 141/279; 141/388; 414/139.4

(58) Field of Search ................................ 141/279, 282, 141/387, 388; 414/137.9, 138.2, 139.4, 139.6, 141.6

(56) References Cited

U.S. PATENT DOCUMENTS

| | | | | |
|---|---|---|---|---|
| 2,914,080 A | | 11/1959 | Silveston | |
| 2,922,446 A | | 1/1960 | Sheiry | |
| 4,202,372 A | * | 5/1980 | Gibbons | 137/615 |
| 6,637,479 B1 | * | 10/2003 | Eide et al. | 141/387 |

FOREIGN PATENT DOCUMENTS

| | | |
|---|---|---|
| GB | 813673 | 5/1959 |
| GB | 1085040 | 9/1967 |

* cited by examiner

*Primary Examiner*—Gregory L. Huson
*Assistant Examiner*—Peter deVore
(74) *Attorney, Agent, or Firm*—Leydig, Voit & Mayer, Ltd.

(57) ABSTRACT

A system for transferring a fluid product between a carrier, such as a vessel, and an installation, in particular a fixed installation, for processing and storing the product. The system includes a tubular structure for conveying the product between the vessel and the installation, a device for connection to a manifold of the vessel and a flexible transfer pipe connected to the installation. The connection device and the pipe are connectable to each other at free ends for transferring the fluid product between the vessel and the installation. At least the free end of the flexible transfer pipe includes a product handler for displacing the free end between a position for connection to the connection device and a disengaged position for storage. The invention enables the transfer of cryogenic liquefied natural gas.

28 Claims, 22 Drawing Sheets

FIG. 23A
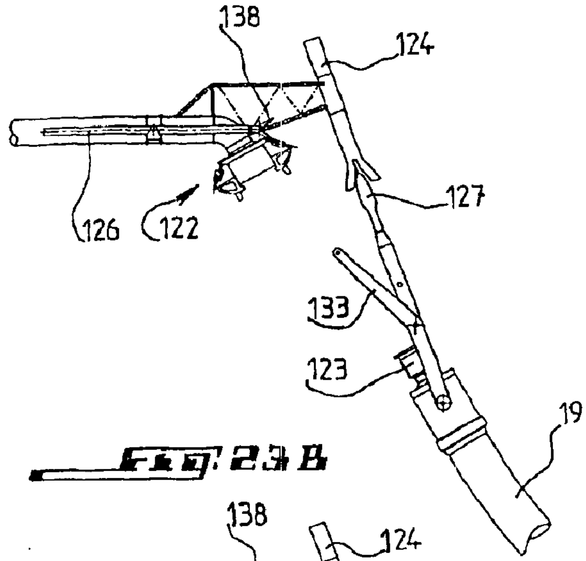
FIG. 23B
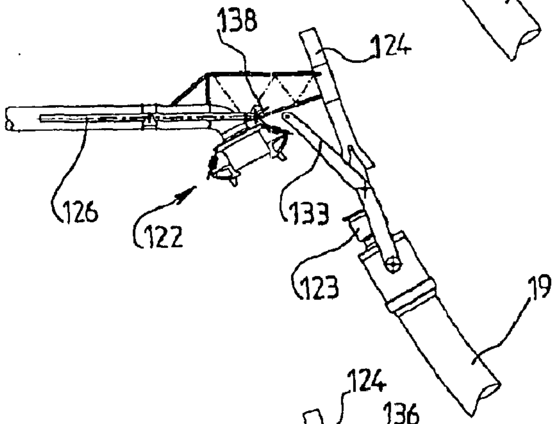
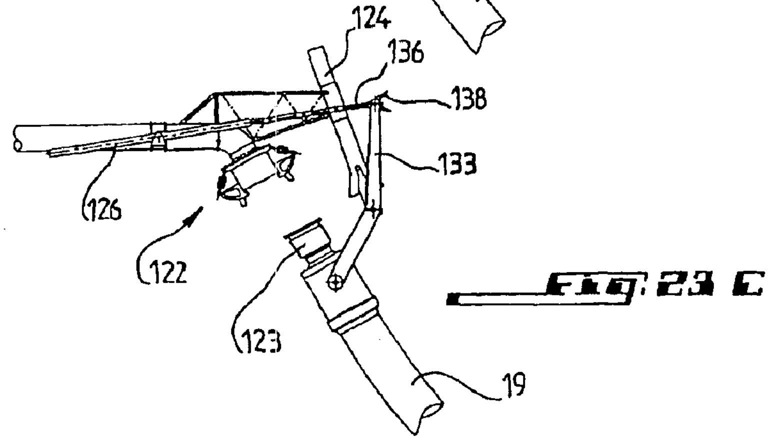
FIG. 23C
FIG. 23D
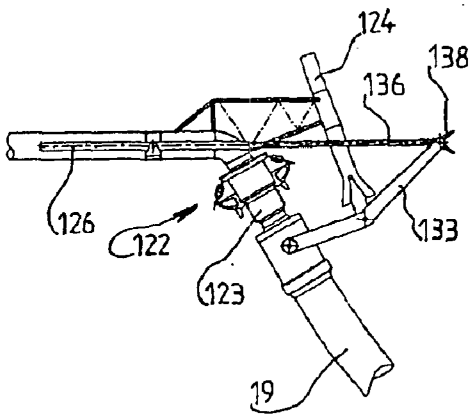
FIG. 23E
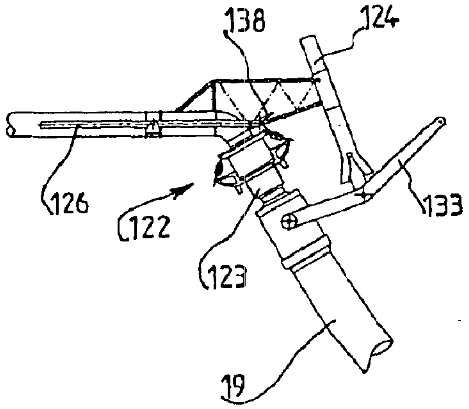

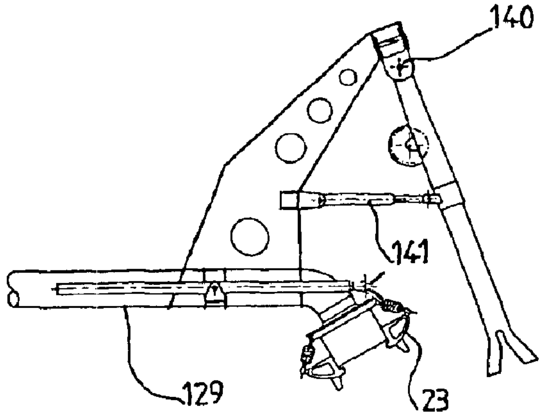
FIG. 24
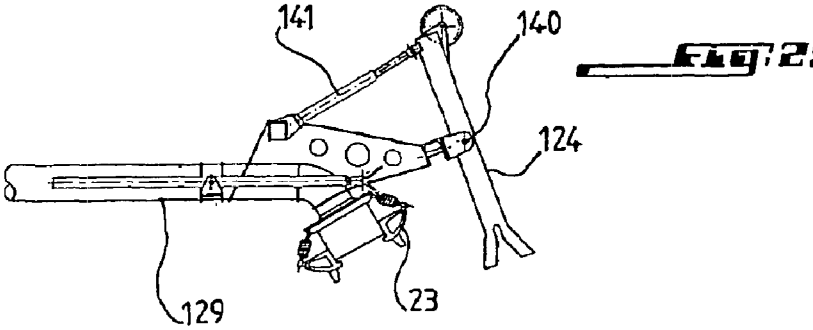
FIG. 25
FIG. 26
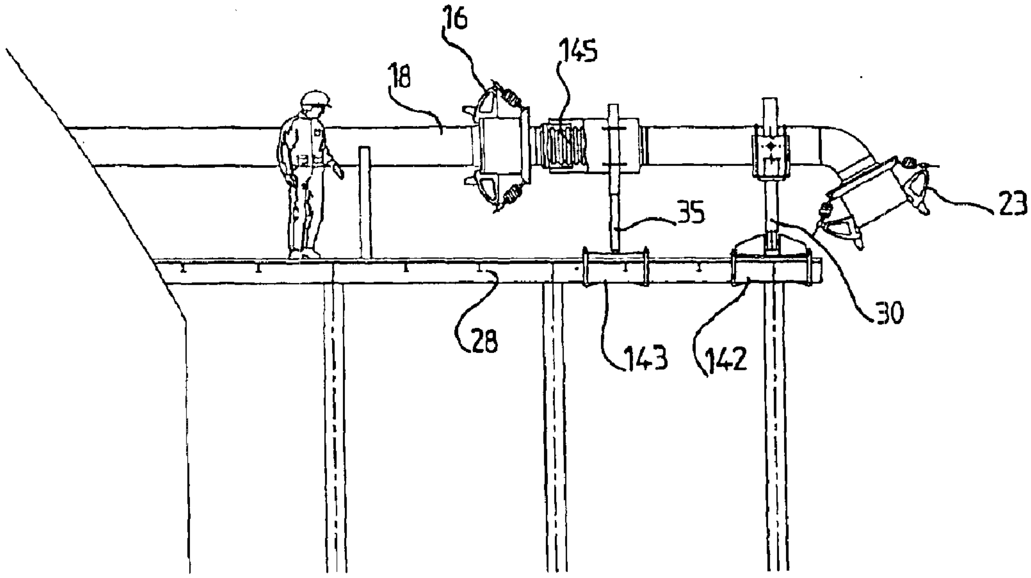

SYSTEM FOR TRANSFERRING A FLUID PRODUCT BETWEEN A CARRYING VESSEL AND A SHORE INSTALLATION

The invention concerns a system for transferring a fluid product, in particular liquefied natural gas, between a carrying vessel, such as a ship, and an installation, especially a shore installation, for processing and storing the product, of the type comprising a tubular arrangement to convey the product between the vessel and the installation, of which one end is connected to the installation and the other end is connectable to the vessel's manifold.

Transfer systems of this type exist for transferring liquefied natural gas. FIG. 1 shows a conventional transfer station for LNG (liquefied natural gas) generally illustrated under reference 1 and comprising a platform 2 on which loading or unloading arms 3 are mounted formed of rigid piping and structures articulated with one another via multiple rotating joints. The transfer station is associated with a mooring installation 4 for vessels to be loaded or unloaded via transfer station 1. The latter is located at the end of a jetty 6 carrying fixed piping which can possibly extend over several kilometres and connects the transfer station to a treatment/storage installation for the product transferred between a carrying vessel and the fixed installation. This type of transfer station is globally satisfactory but has the major disadvantage of tending to make transfer stations and their environment more sophisticated and cumbersome, and hence to increase the overall costs of installations.

This invention sets out to remedy these disadvantages and puts forward a transfer system of relatively simple structure adaptable to sites with even a difficult environment, while lowering costs.

SUMMARY OF THE INVENTION

To solve this problem, a transfer system of the invention is characterized in that it comprises at least one connection device to the manifold of the vessel and at least one flexible transfer pipe connected to the shore installation, and in that the connection device and flexible pipe are able to be connected to one another at their free ends for the transfer of a fluid product between the vessel and the fixed system, and in that the flexible transfer pipe is provided with handling means making it possible to move its free end between a connection position to the connection device and a disengaged storage position.

According to one characteristic of the invention, the connection device is in the form of a connection module and this module is provided with handling means enabling it to be moved between a manifold connection position and a disengaged storage position, and with a device with which it leans on the vessel's manifold platform in its connection position.

According to another characteristic of the invention, the conveying arrangement comprises an emergency disconnection device for the flexible transfer pipe.

According to another characteristic of the invention, the emergency disconnection device for the flexible transfer pipe is provided in the connection module.

According to a further characteristic of the invention, the emergency disconnection device is provided on the mobile end of the flexible pipe.

According to a further characteristic of the invention, the transfer arrangement comprises a fall braking device for the free end of the flexible transfer pipe in the event of emergency disconnection.

According to another characteristic of the invention, the fall braking device comprises a winch provided on that part of the arrangement which remains connected to the manifold in the event of emergency disconnection, and around which a cable is coiled whose free end is fixed to the free end of the transfer pipe, said cable disconnecting itself in the event of emergency disconnection.

According to another characteristic of the invention, the connection device comprises a guide/alignment device to guide the free end of the transfer pipe towards a receiving end provided on the connection device to receive said free pipe end.

According to a further characteristic of the invention, the guiding device comprises a trumpet provided on the connection device and a cone provided on the mobile end of the flexible pipe as well as means for engaging the cone in the trumpet when the flexible pipe is connected to the connection device.

According to another characteristic of the invention, the above-cited means comprise a winch provided on the connection device and a cable coiled around the winch whose free end is able to be fixed to the above-mentioned cone.

According to another characteristic of the invention, the above-mentioned handling means are provided on a bearing structure, such as a gantry, mounted on a platform device.

According to another characteristic of the invention, the handling means for the mobile end of the transfer pipe comprise a winch and a cable coiled around the winch at whose free end said flexible pipe end is suspended.

According to another characteristic of the invention the handling means for the connection module comprise a crane mounted on the bearing structure, and said module is suspended from said means via a cable when being handled.

According to another characteristic of the invention, the connection module bearing device on the vessel is an adjustable bearer connected to the module by an articulation having a horizontal axis.

According to another characteristic of the invention the connection module comprises a bellows device, advantageously a bellows joint.

According to another characteristic of the invention, the connection device is integrated at the end of the vessel's manifold.

According to another characteristic of the invention, a flexible transfer pipe is formed by a flexible pipe such as a cryogenic flexible line when the product is liquefied natural gas.

According to another characteristic of the invention, the flexible transfer pipe is a succession of parts articulated with one another.

According to another characteristic of the invention, the flexible transfer pipe is chain hung.

According to another characteristic of the invention the means to which the fixed end of the flexible transfer pipe is permanently fixed are formed of a bearing structure such as a gantry advantageously mounted on a platform.

According to a further characteristic of the invention, the bearing structure comprises equipment for connecting the flexible transfer pipe to the immersed cryogenic line of the shore installation.

BRIEF DESCRIPTION OF DRAWING FIGURES

The invention will better understood, and other purposes, characteristics, details and advantages thereof will become more apparent in the following explanatory description which refers to the appended schematic drawings given solely by way of example and illustrating several embodiments in which:

FIGS. 11 and 12 are elevation views of a third embodiment of a connection module and of the mobile end of a flexible pipe, respectively in progress of connection and when connection is made;

FIGS. 23A to 23E are elevation views illustrating different steps in the connection process between the integrated connection device shown in FIG. 19 and the flexible pipe end shown in FIG. 21;

FIGS. 24 and 25 are elevation views of another embodiment of manifold integration;

FIG. 26 is a simplified elevation view of yet another embodiment of a connection module;

DETAILED DESCRIPTION

The invention is described below in its application to the transfer of a liquefied natural gas. Evidently the invention may be used for any other fluid product, such as liquids, powdery products and gases of any other kind.

Figure 2:
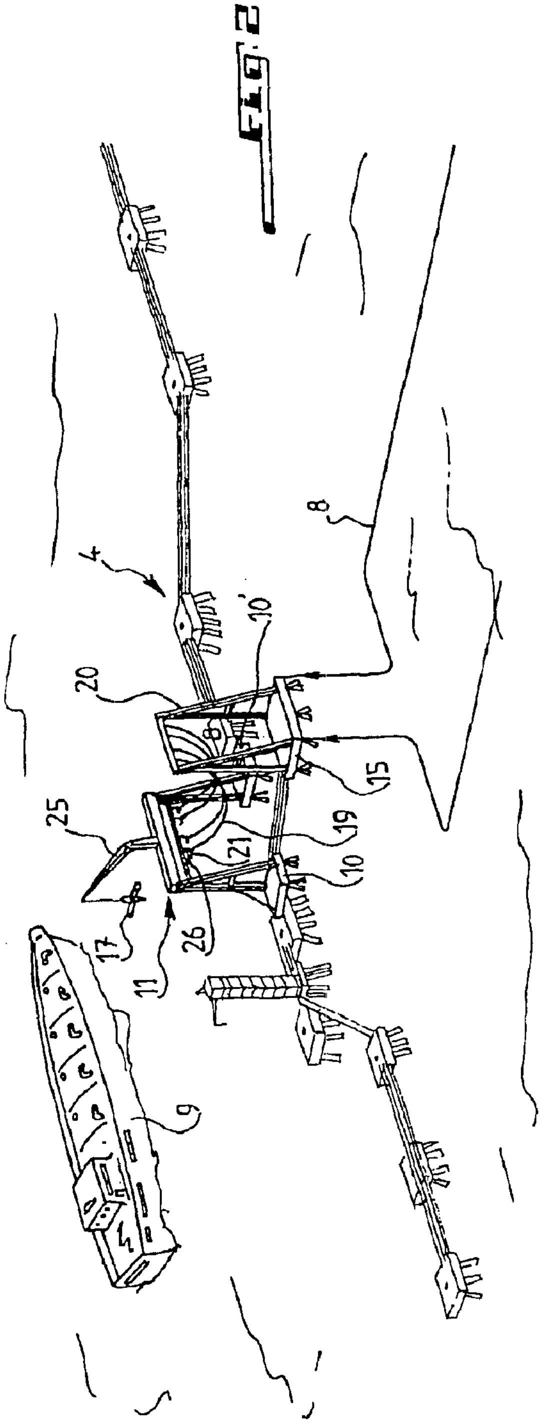
FIG. 2 is a perspective view of a transfer system according to the present invention.
Figure 3:
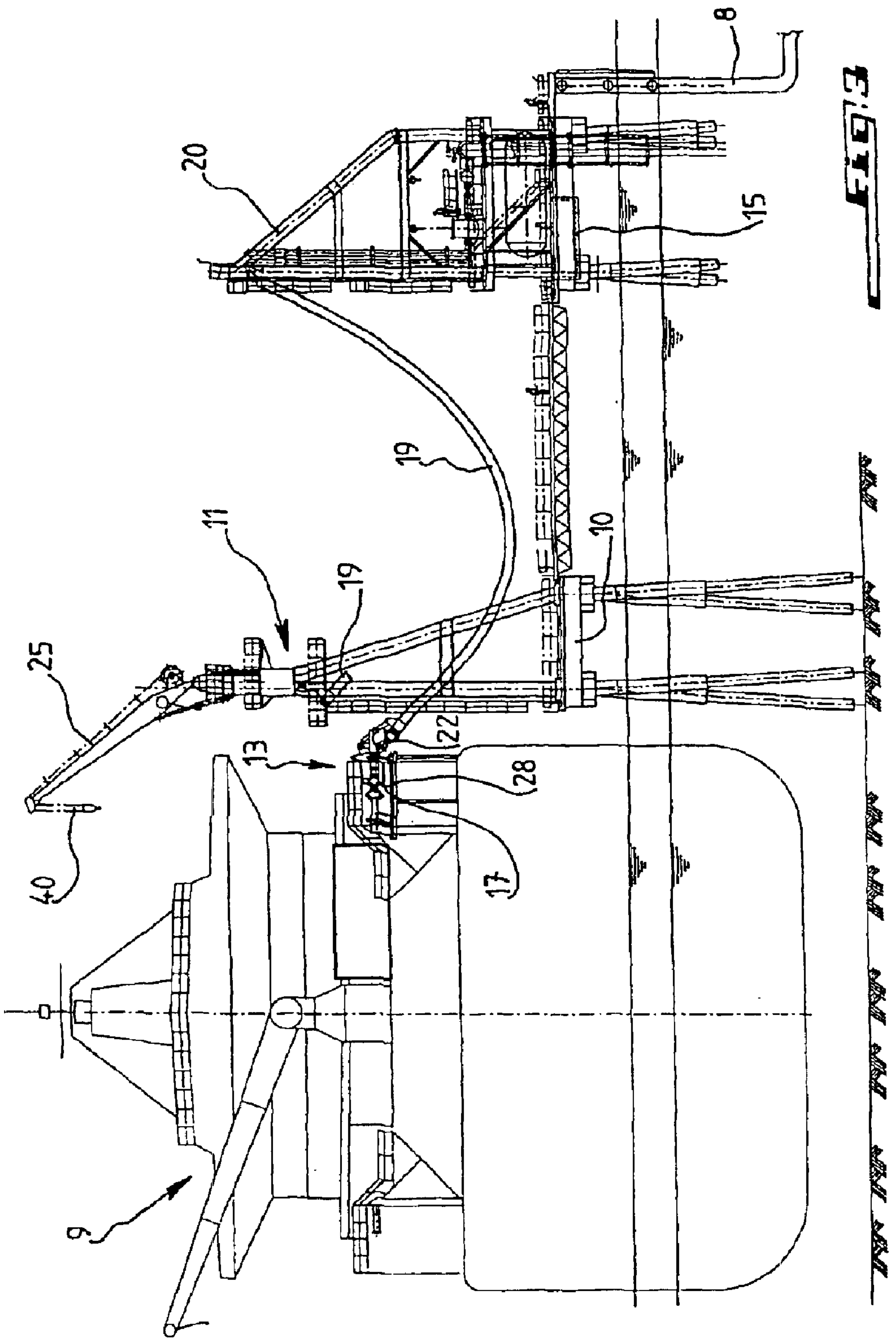
FIG. 3 is an elevation view of a transfer system according to the invention of the type shown in FIG. 2.
Figure 4:
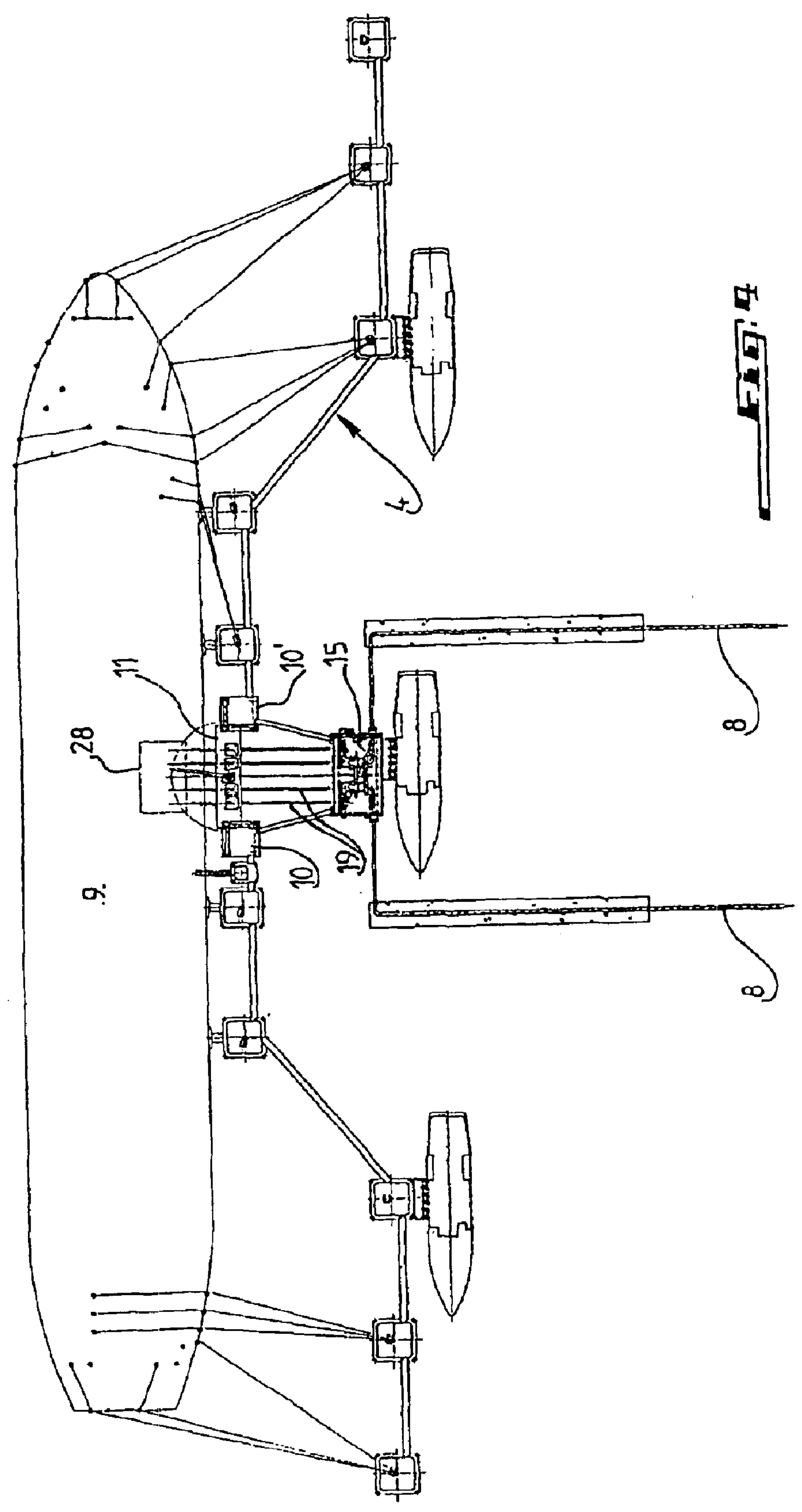
FIG. 4 is an overhead view of the transfer system in FIG. 3.

FIG. 2 shows a transfer system 1 according to the present invention.

Figure 1:
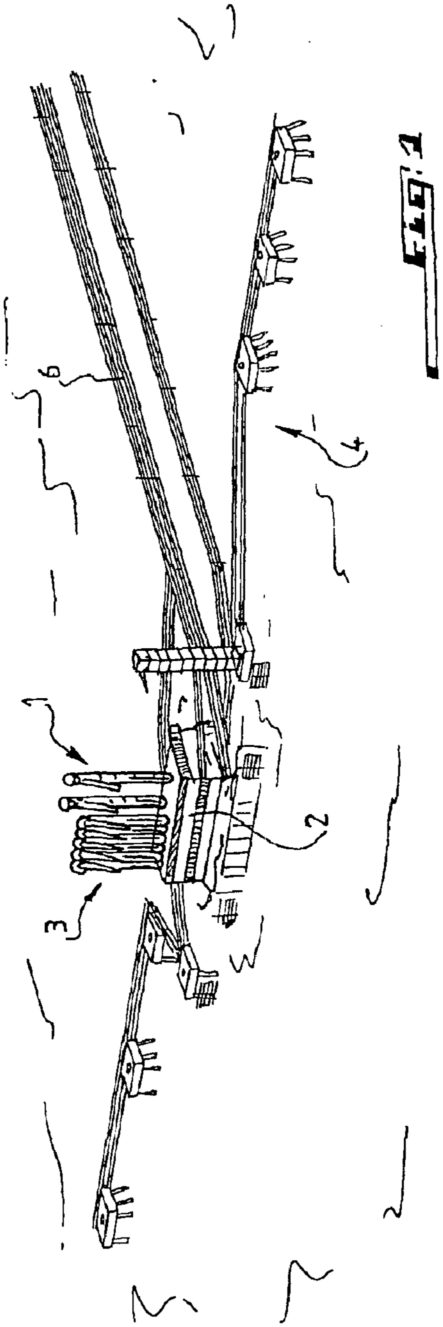
FIG. 1 is a perspective view of a conventional transfer station.

This transfer system may do without the jetty 6 which carries the piping of the conventional transfer station shown in FIG. 1. In the case of the invention the product transfer, in this example liquefied natural gas (called LNG), is ensured by immersed cryogenic lines denoted 8 in the example shown. Although the transfer system 1 is shown as part of a conventional mooring architecture, it is to be noted that this mooring architecture could be simplified for reasons given below in the detailed description of the transfer station.

As shown in the figures, a transfer system 1 forming the interface between a vessel 9 and the fixed treatment and storage system, of which only the immersed conveying lines 8 are shown, essentially comprises two platforms 10, 10' bearing a storage/handling gantry 11 for one or more transfer arrangements 13 of the fluid product and a main platform 15 to take all the equipment to which the immersed cryogenic lines 8 are connected and which is required for connection to transfer arrangements 13. The equipment will not be described in detail as this is not necessary for understanding of the invention.

In a transfer system of the invention, suitable for standard vessels, a transfer arrangement 13 essentially comprises at least one connection module 17 intended to be connected at one end to a vessel's manifold 18 and, associated with each module, a flexible transfer pipe 19 advantageously in the form of a flexible cryogenic line as described, made for example by the company Coflexip Stena Offshore. The flexible transfer pipes 19 are permanently fixed at one end to a gantry 20 resting on the main platform 15, while the other free end 22 can be connected to connector 23 positioned at the other end of module 17.

The chief function of gantry 11 is to enable handling and storage of transfer parts, namely each connection module 17 and the mobile ends 22 of the flexible cryogenic lines 19, by means of a crane 25 and winches 26 respectively. As shown in the figures, a connection module 17 is suspended from crane 25 and can be moved between a storage position on gantry 11 and a transfer position in which the module is supported on the manifold platform 28 by means of its own bearing device 30 and is connected by its connector 16 to the manifold flange 18. The free end 22 of each flexible cryogenic line 19 is suspended by a cable 31 from a winch 26 of gantry 11 and can be moved between a storage position shown in particular in FIG. 5A in which it is disconnected from module 17, and its transfer position in which it is connected to connector 23 of module 17, as clearly shown in FIG. 5E.

Figure 6:
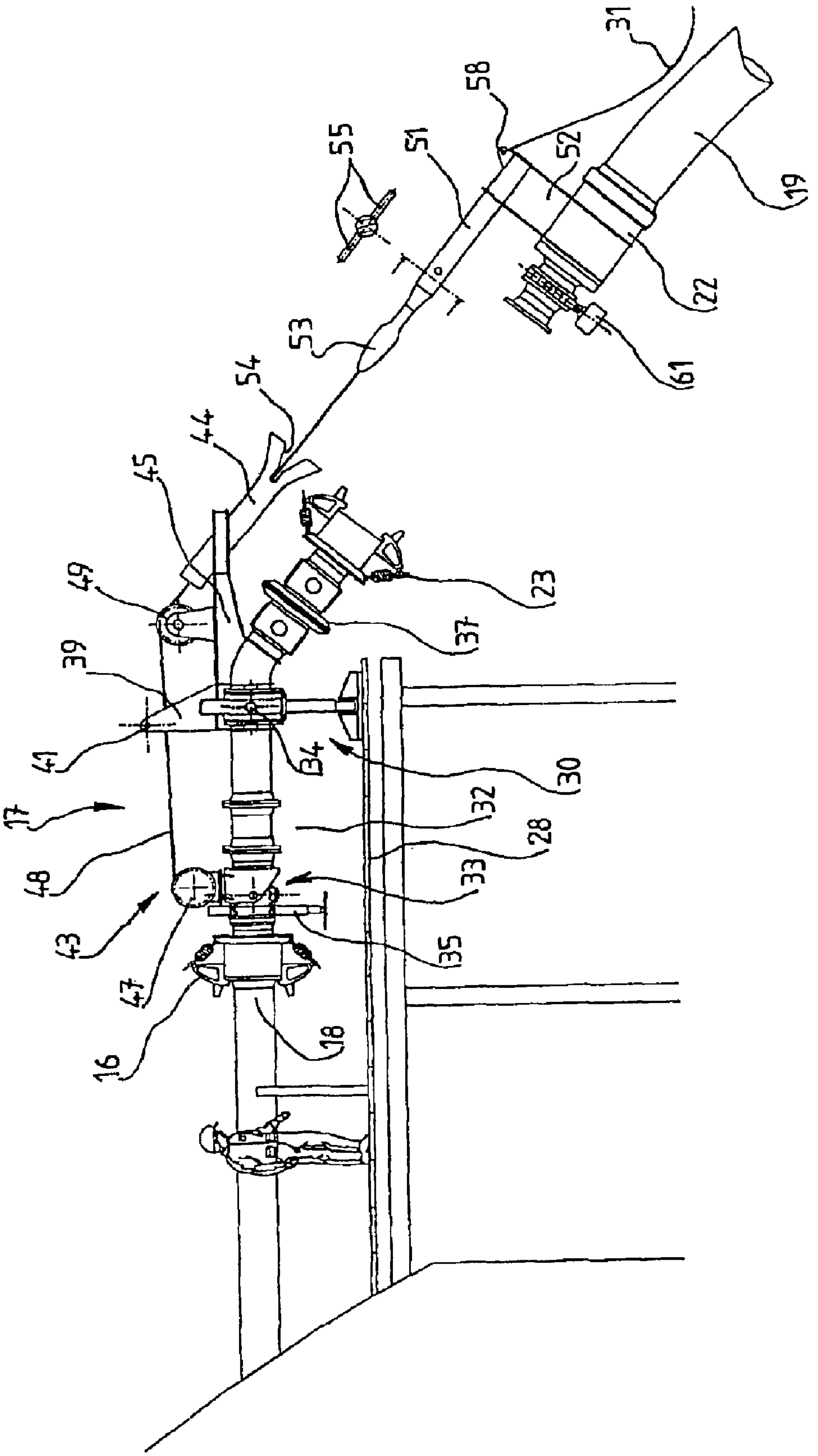
FIG. 6 is a view on a larger scale of a connection module of the invention and of the free end of a flexible pipe in the transfer system of the invention, showing the flexible pipe in progress of being connected to the module.
Figure 8:
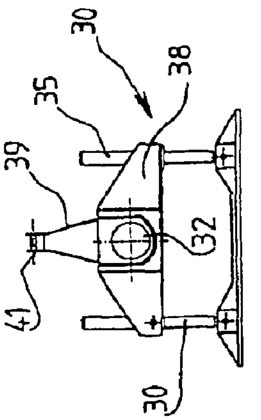
FIG. 8 is a view along the direction indicated by arrow VIII in FIG. 7 of the bearing device for the connection module.
Figure 7:
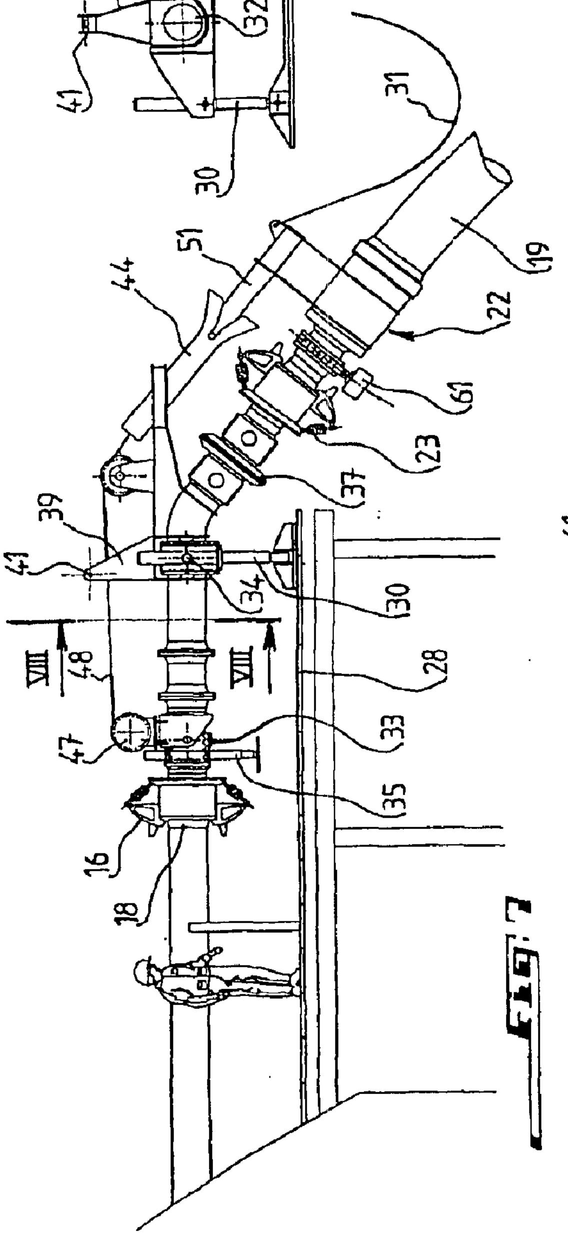
FIG. 7 is a similar view to FIG. 6 but shows a flexible pipe in its connected position to the module.

With reference to FIGS. 6 to 8, the structure of a first embodiment of a transfer arrangement 13 of the invention is now described in more detail.

The connection module 17 of this arrangement, between its fixing connector 16 to the vessel's manifold flange 18 and the support or bearing device 30 on the vessel's manifold platform 28, comprises a bellows joint device 33 to insulate the manifold flange from forces of the flexible pipe at the time of its connection to the manifold when it leans on the manifold platform. The adjustable bearer device 30 is connected to the module via an articulation having a horizontal axis 34. Optionally an additional articulation (not shown) may be used to allow rotations along the axis of the manifold. As can be seen in FIG. 8, the bearer 30 comprises two adjustable supporting struts 30 bearing a crosspiece 38 which carries piping 32. In addition to bearer 30, the module is provided with an adjustable foot 35 positioned at the bellows joint 33 and intended to provide additional support in particular for module storage.

Module 17, in its part positioned between bearer device 30 and connector 23 for connection to the flexible cryogenic line 19, comprises an emergency disconnection device 37 intended to ensure disconnection of the transfer link in the event of an emergency. This device is known in itself and does not therefore need to be described in detail. For this purpose the device marketed by MIB International Limited could be used marketed under the name "Hydraulically Operated Double Valve with Emergency Release Systems for Service with LNG". It will be ascertained that the connection part to the flexible pipe is slanted downwards relative to the horizontal tubular part resting on manifold platform 28.

As regards connectors 16, 23 to the two ends of module 17, these may be hydraulic connectors, for example of the type known under the name QCDC (Quick Connect/ Disconnect Coupler) or they may be manual couplers.

Connection module 17 also comprises a hooking flange 39 to cable 40 of crane 25, the hooking point 41 being positioned at the centre of gravity of module 17. The module is also equipped with a device 43 intended to guide the end 22 of flexible pipe 19, having mouthpiece configuration, when it is being connected to module connector 23. This device essentially comprises a part in the form of a guide trumpet 44 extending substantially parallel to the axis of the inclined part of module 17, on which flexible pipe 19 is to be connected and is carried by a part 45 integral with piping 32. Device 43 also comprises a winch 47 provided on the bellows joint part 33 around which a cable 48 is coiled whose free end is brought through the trumpet 44 passing over a return pulley 49 so that it can be fixed to a guide/ alignment rod 51, called a cone, which is integral with the mouthpiece 22 of flexible cryogenic line 19 and extends substantially parallel to the axis of this end. The front free end 53 of this alignment rod is adapted so that it engages in trumpet 44 when mouthpiece 22 of the flexible pipe is to be connected to module 17. To ensure perfect alignment of the mouthpiece relative to module connector 23, all that is required, after fixing the end of cable 48 to the front end 53 of the cone, is to coil this cable around winch 47. It is seen that cone 51 has two diametrically opposite side blades 55 which, when cone 51 engages in trumpet 44, house themselves in diametrically opposite side slits 56 provided in the front flared part of trumpet 44. The width of these slits becomes increasingly narrower on and after the blade reception end. The mouthpiece 22 of the flexible pipe is hooked at 58, at the base of the alignment cone 51, to cable 31 of winch 26 of gantry 11. It is also to be noted that the mobile mouthpiece 22 of the flexible pipe may be fitted with a valve 61.

Regarding the flexible cryogenic lines 19, these are used in a natural chain whose fixed end is advantageously centred relative to the movements of the mobile end. It has been found that by choosing an appropriate length of flexible pipe, it is not necessary to use rotating joints or end stiffeners. To prevent flexible pipes being exposed to excessive mechanical stresses, their free ends 22 are always supported, both when in storage and during the connection process to module 17 and in the event of emergency disconnection. In this latter case, winch 47 acts as a fall braking means for the free end of the flexible pipe which has just been disconnected.

With reference to FIGS. 5A to 5G, the process is described below for setting up a transfer connection for a fluid product between the vessel and the fixed shore installation and for disconnecting in the event of an emergency.

Figure 5A:
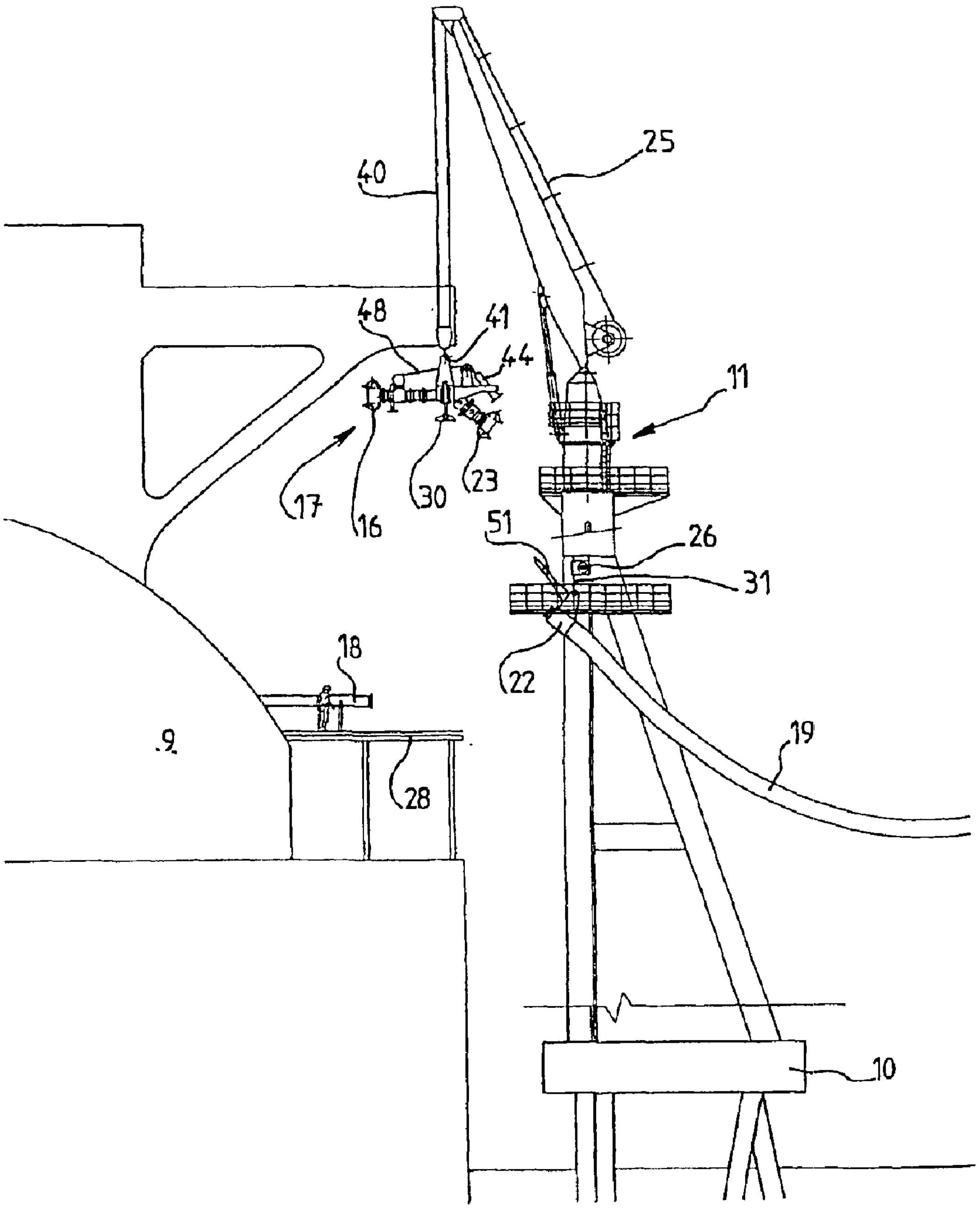
FIGS. 5A to 5G are partial elevation views schematically illustrating a transfer system of the invention and showing the different phases for setting up and separating a transfer link between a vessel and the shore installation.
Figure 5B:
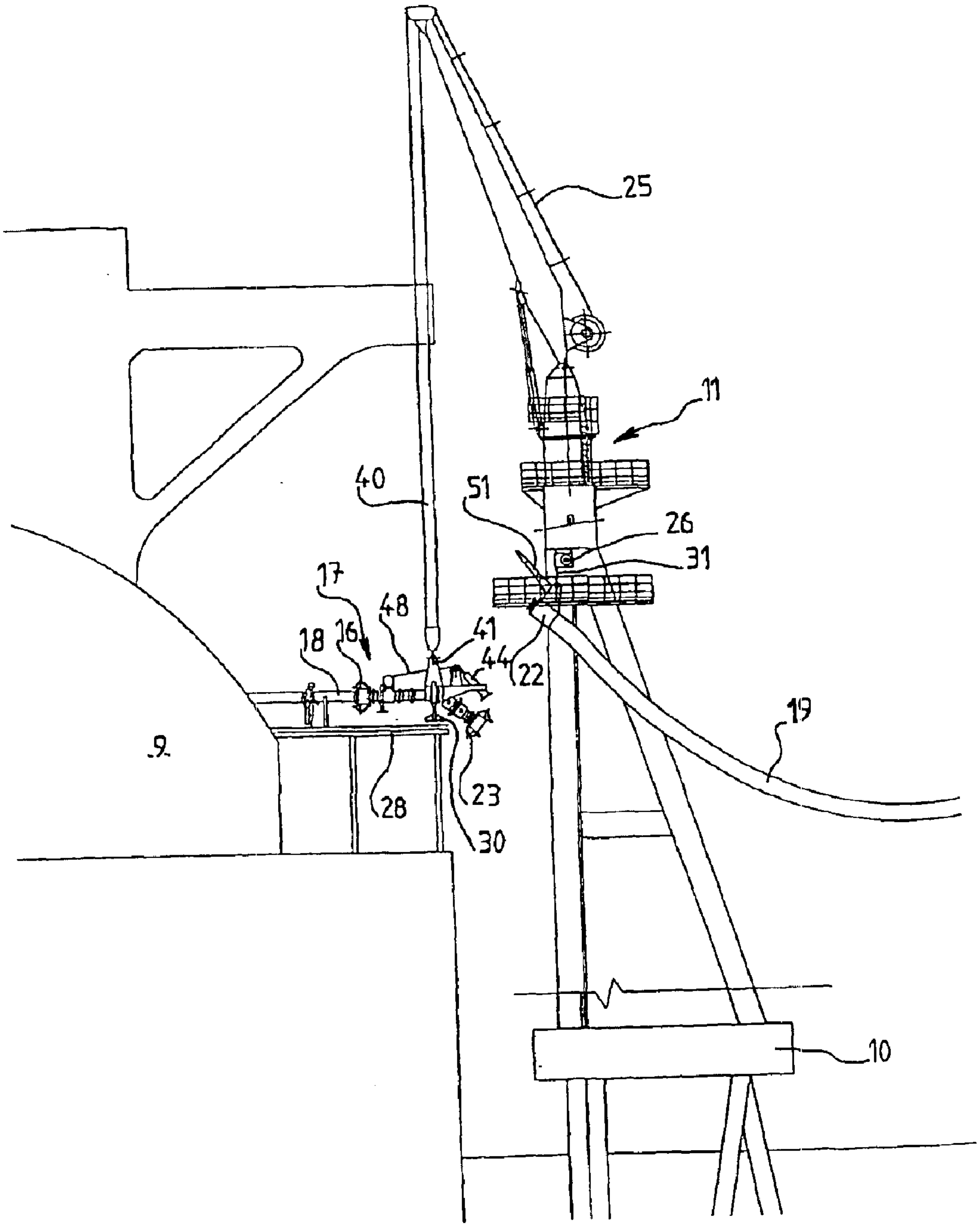
Figure 5C:
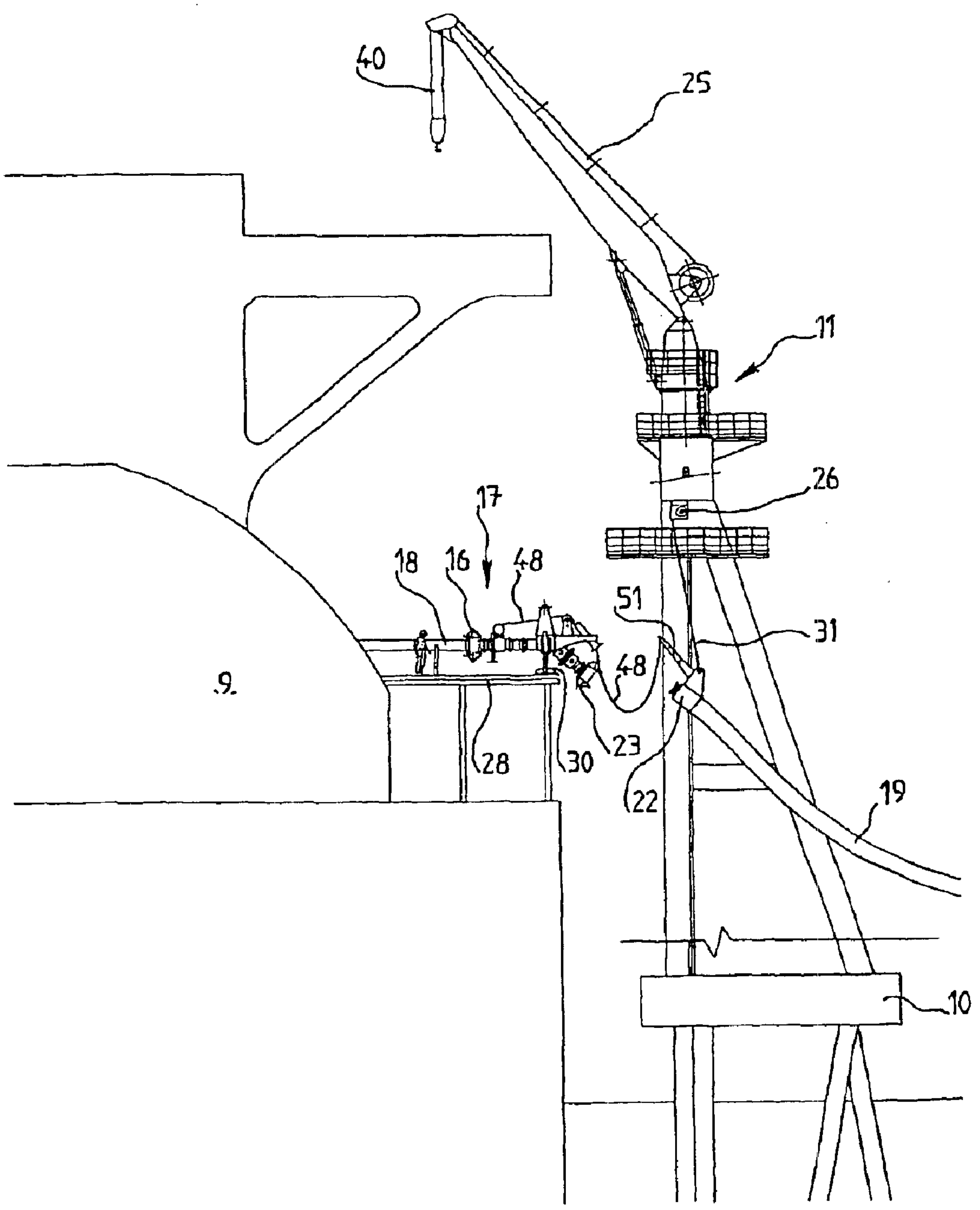
Figure 5D:
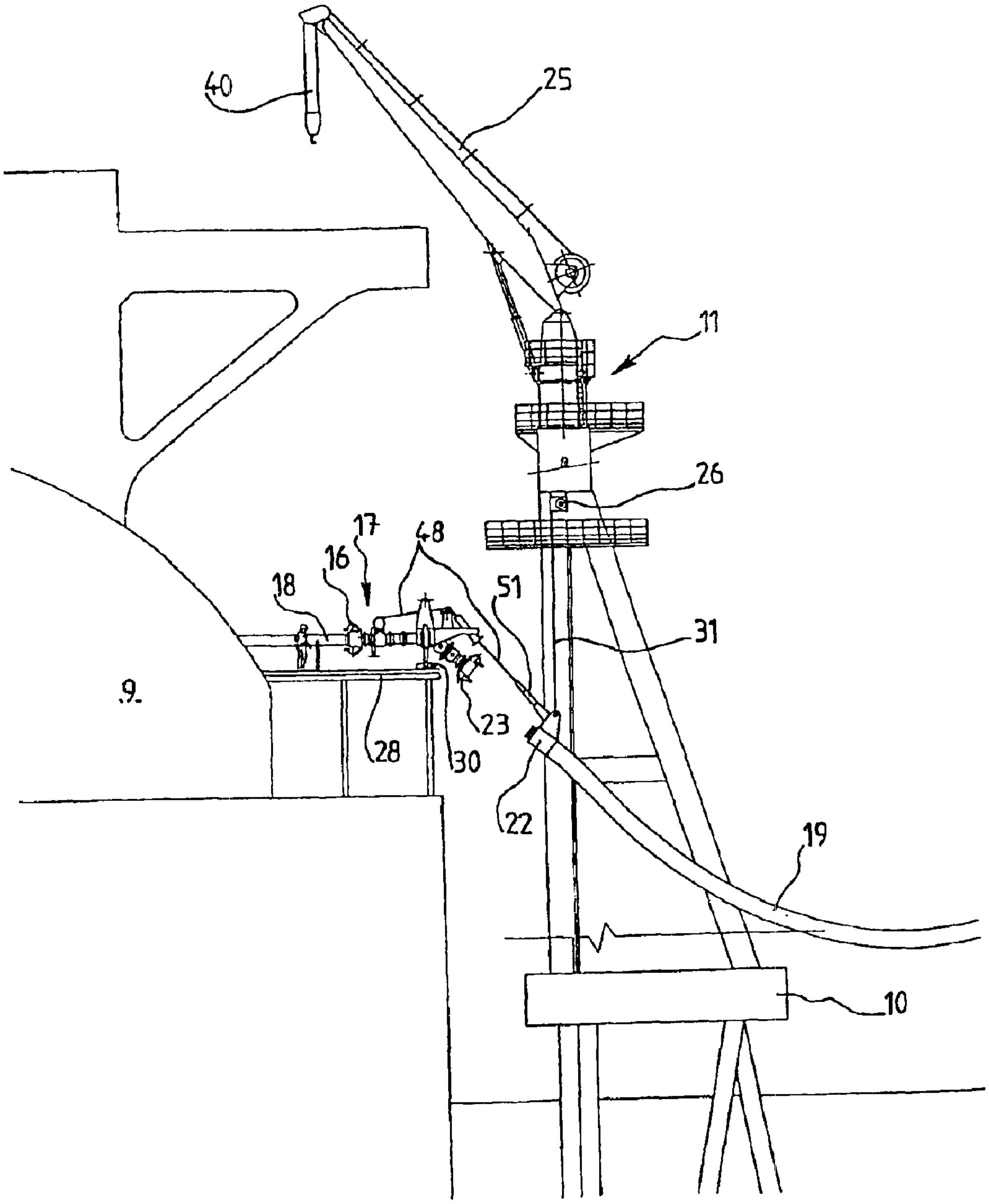
Figure 5E:
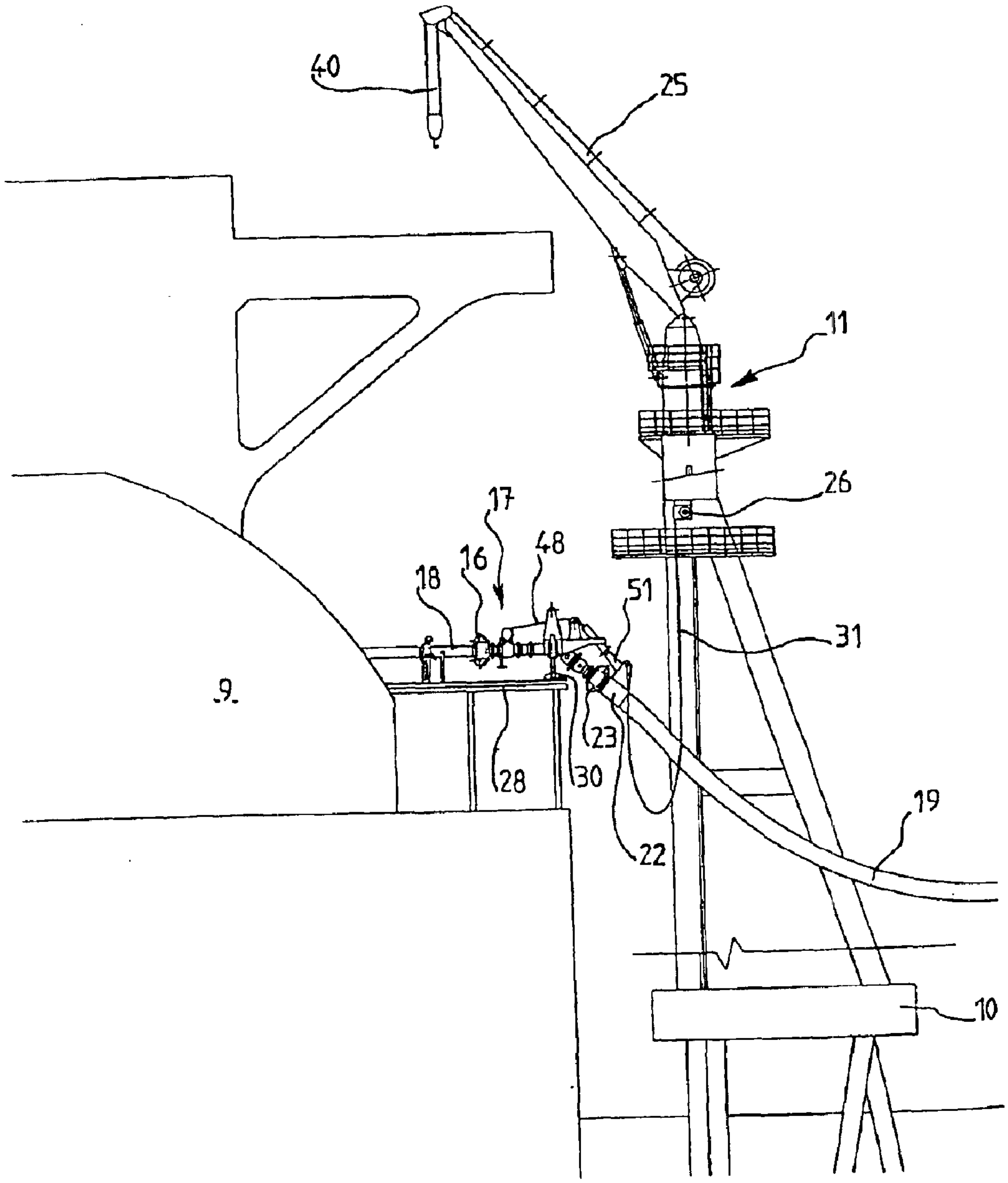

FIG. 5A shows the transfer parts, namely the connection module 17 in the handled state and flexible pipe 19 in the stored state, the module being suspended from cable 40 of crane 25 and the free end 22 of the flexible pipe from winch 26 via cable 31. To set up a transfer connection, firstly module 17 is lowered by means of crane 25. When the module reaches the lower bridge of gantry 11, cable 48 of winch 27 can be connected to the front end of cone 51. Module 17 is again lowered until it can be connected via its connector 16 to the vessel's manifold flange 18, the module being supported on platform 28 via bearer device 30 (FIG. 5B). The free end 22 of the flexible pipe is then lowered by means of winch 26. The free end 22 is subsequently drawn towards connector 23 of the module by means of winch 47 provided on the module, and the end of the flexible pipe is fixed to connector 23 using the guide/alignment device by engaging cone 51 in trumpet 44 of the module. FIG. 5E shows the flexible pipe in its connected position to module 17.

Figure 5F:
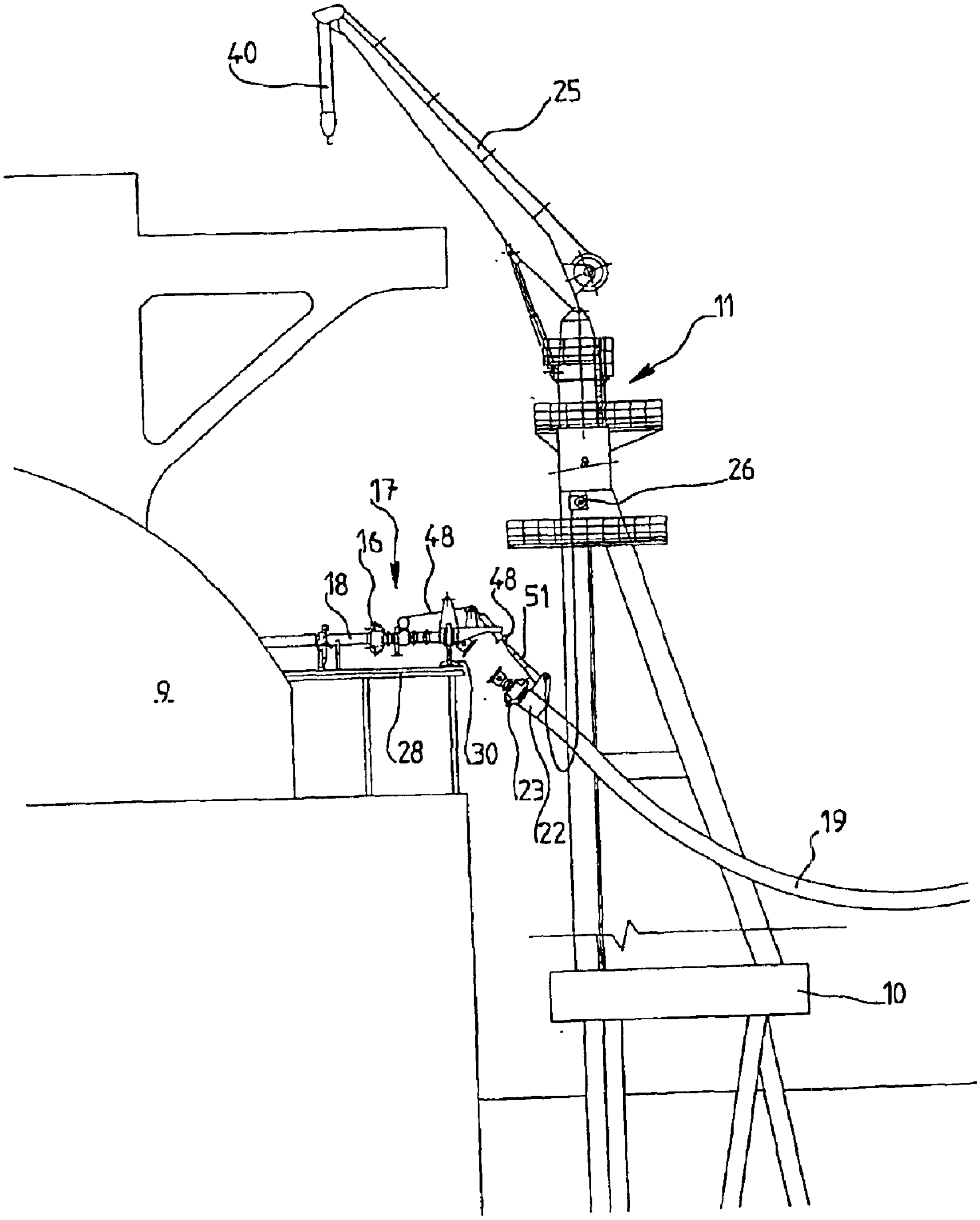
Figure 5G:
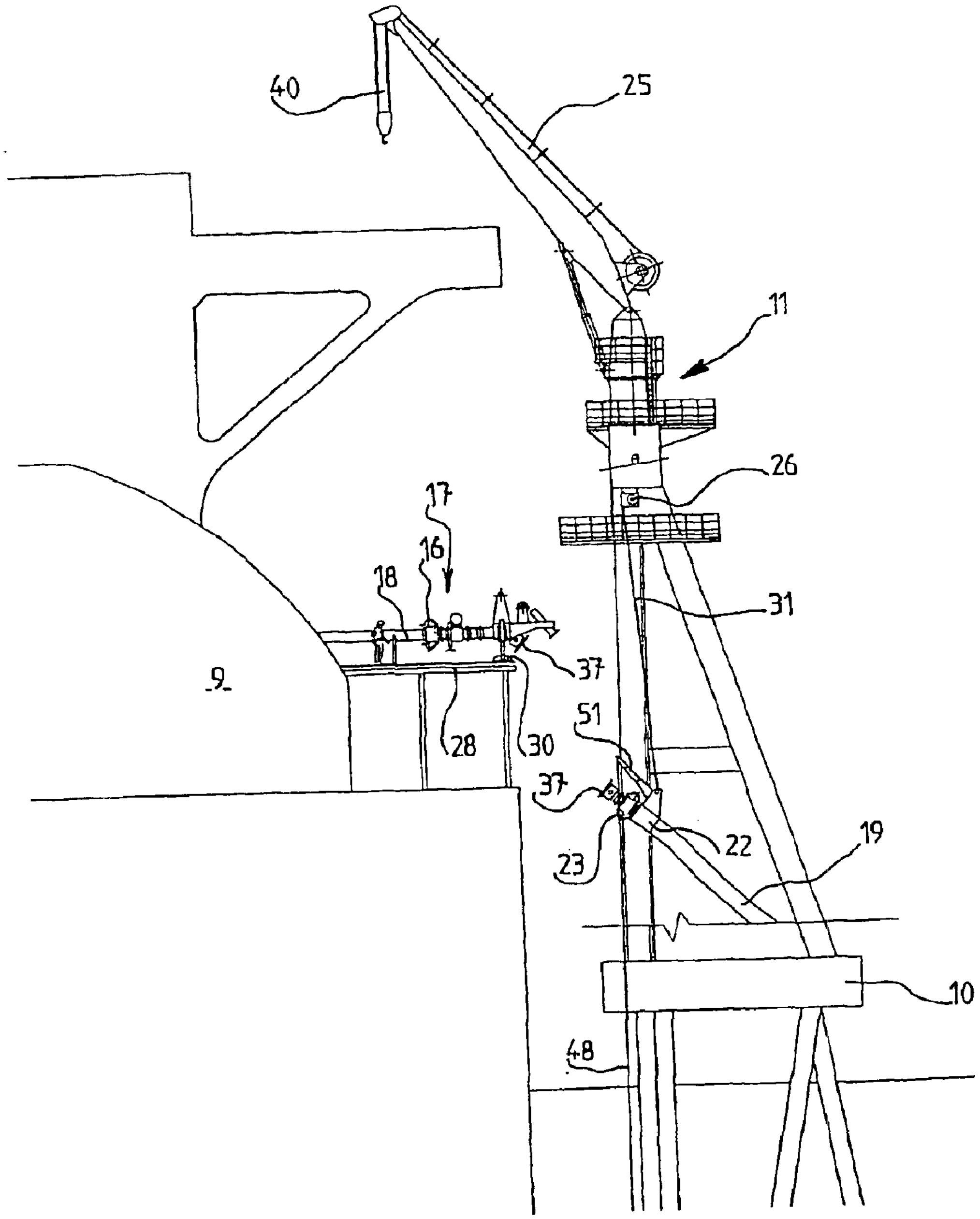

FIGS. 5F and 5G illustrate the process of emergency disconnection after opening the emergency disconnection device 37. When the flexible pipe moves away under the effect of the chain tension its movement is braked by cable 48 which is coiled around the winch without being completely attached to it. After full uncoiling of the cable, the free end is borne by cable 31 of winch 26 in accordance with FIG. 5G.

The description of the invention just given with reference to FIGS. 2 to 7 is not restrictive and numerous modifications can be made to the described assembly which is only to be considered as a first embodiment of the invention.

Figure 10:
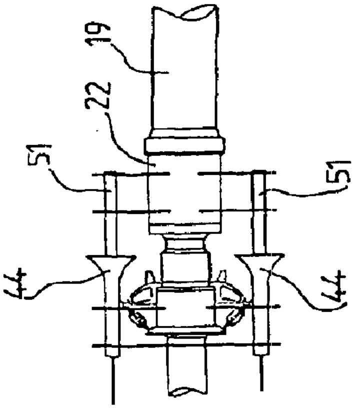
FIG. 10 is a detached overhead view along the direction of arrow X in FIG. 9.
Figure 9:
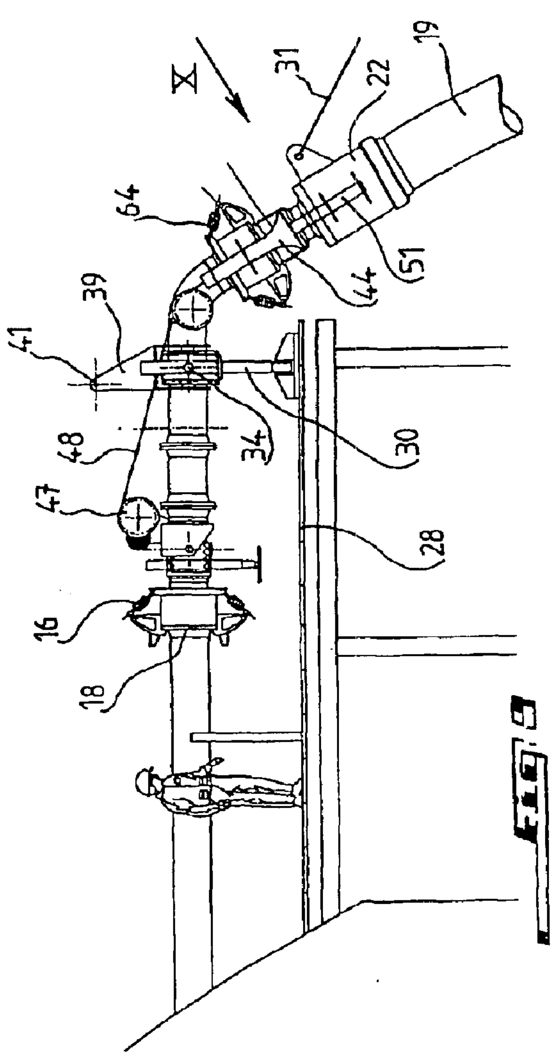
FIG. 9 is an elevation view of a second embodiment of the connection module to which the end of a flexible cryogenic pipe is connected.
Figures 13, 14:
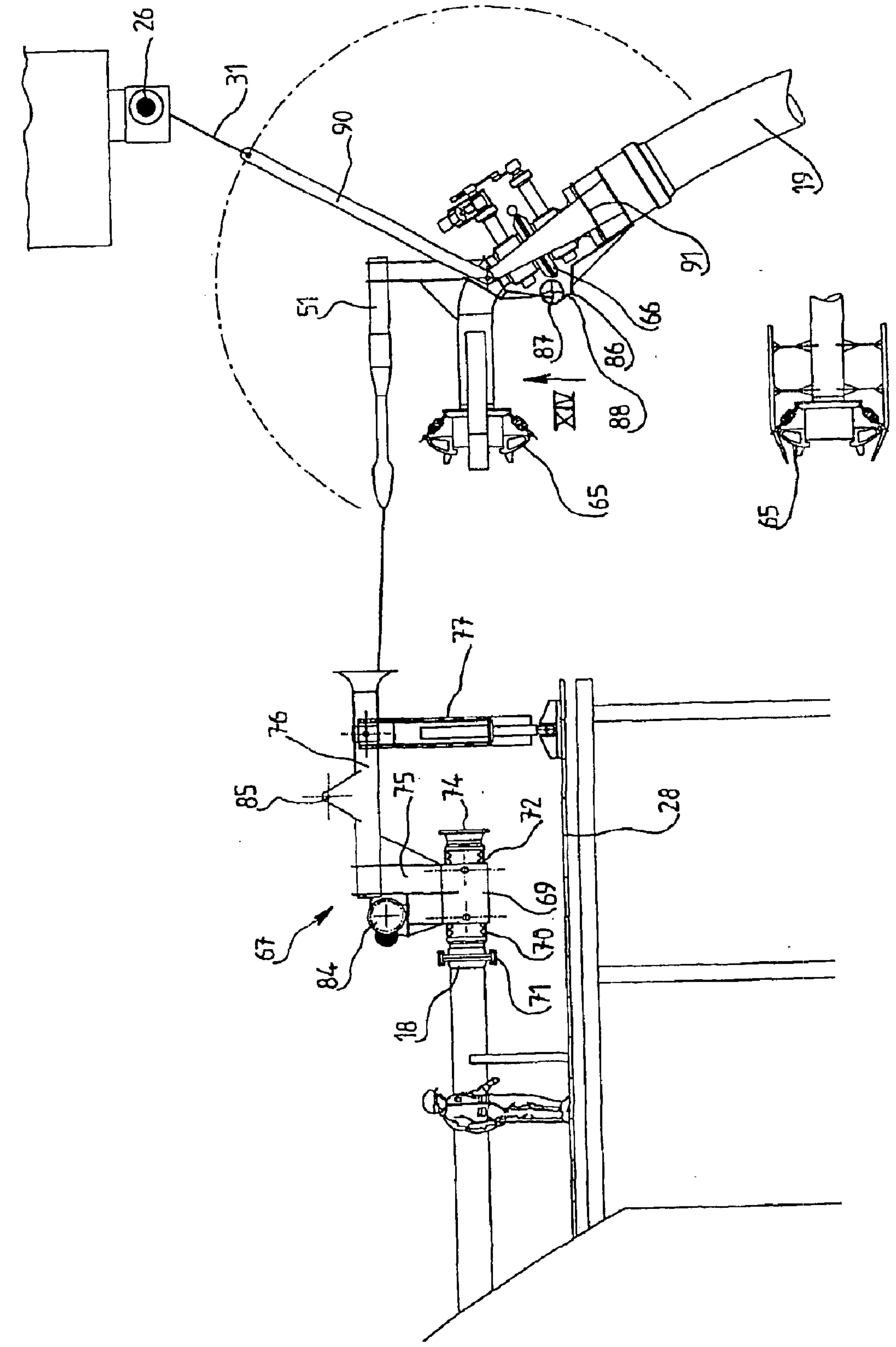
FIG. 13 is a view along the direction of arrow XIII in FIG. 12 of the connection module bearing device.
FIG. 14 is a detailed view along the direction of arrow XIV in FIG. 11.
Figures 12, 13:
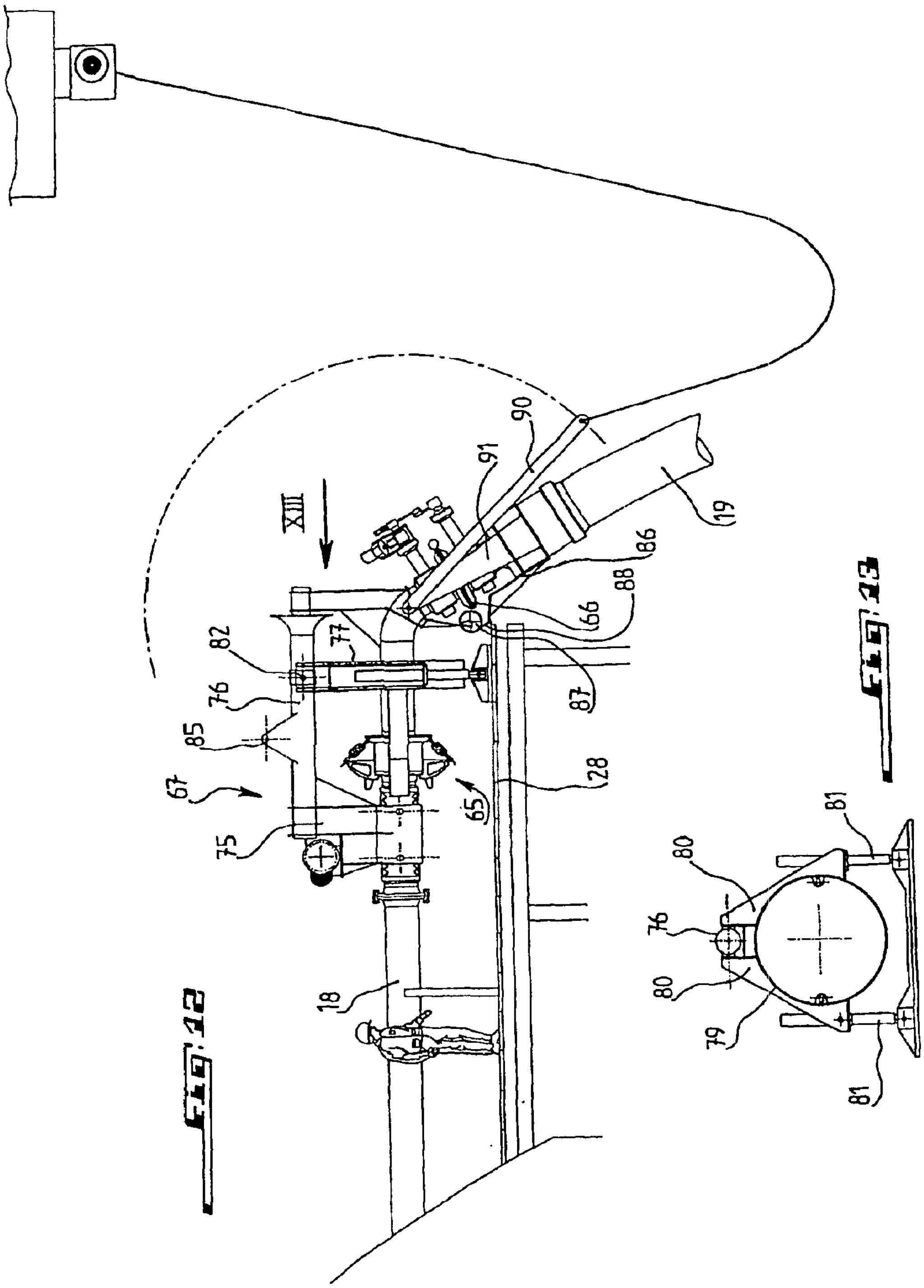

Another embodiment is shown in FIGS. 9 and 10, which is particular in that the emergency disconnection function is integrated with the fixing connector for end 22 of flexible pipe 19. This connector is also known in itself, for example of the type known under name "Coupler Integral Valve and Hose End Valve", marketed by MIB and designated 64. In this embodiment, the alignment device could be the one provided in the first embodiment. But in this second embodiment, as also in the first, an alignment device could be considered which comprises two alignment cones of cone 51 type arranged diametrically opposite one another along a horizontal plane and cooperating with two alignment trumpets of trumpet 44 type. In this case, the fixing module would be equipped with two winches of type 47 or with one winch having two drums.

FIGS. 11 to 14 illustrate a third embodiment which is particular in that the connector provided for coupling the connection module to flexible pipe 19 as well as the emergency disconnection device are provided on the end of the flexible pipe. The connector and the disconnection device are respectively denoted 65 and 66. As shown in the figures, the structure of the connection module now denoted 67 is simplified. This module 67 comprises part of a tubular transfer structure which contains a central sleeve 69 connected at one end to a bellows joint 70 carrying a hydraulic or manual connector 71 for attachment to the vessel's manifold flange 18 and at its other end a bellows joint 72 carrying a flange 74 to receive connector 65 of the flexible pipe. Sleeve 69 is mounted via a vertical part 75 and a horizontal part 76 forming the alignment trumpet on a supporting frame 77 via which the module rests on the vessel's manifold platform 28. This frame 77 essentially comprises a ring 79 held between two parts of a bracket 80 of which each is provided with a foot 81 intended to rest on platform 28. The trumpet 76 and supporting frame 77 are connected to each other via a horizontal articulation axis 82. On module 67, as previously, winch 87 is provided for the alignment device of the flexible pipe end. The hooking point 85 of the module is provided on trumpet device 76.

The end or mouthpiece of the flexible pipe is angled and comprises a horizontal part carrying connector 65 and an inclined part 86 located in the axial extension of the flexible pipe and which carries emergency disconnector 66. Cone 51 extends parallel to the horizontal part of the mouthpiece over a distance equal to the distance between the axes of trumpet 76 and of flange 74 of the module.

In this embodiment, the fall-braking winch referenced 87 is mounted on part 86 on the angled side, while the free end denoted 88 of the cable coiled around the winch is fixed to part 86 on the flexible pipe side. The end of the flexible pipe is fixed at its bend to cable 31 of winch 26 of the handling and storage gantry 11 via a fork piece 90 which articulates substantially at the centre of gravity of the mouthpiece with two clips 91 integral with the end part on the flexible pipe side and diametrically opposite.

As can be seen in FIG. 11, when a connection is being made between module 67 and connector 65 at the end of flexible pipe 19, the latter has to pass through ring 79 before being attached to flange 74 of the module. In the event of emergency disconnection, it is the end portion of the device on the flexible pipe side which separates from the other end portion carrying the winch, which is fixed to the module. Any fall of the separated portion is braked by winch 87. It will be seen that in this embodiment, the end of the flexible pipe rests on supporting frame 77 via its cone 51 and trumpet 76.

Figure 15:
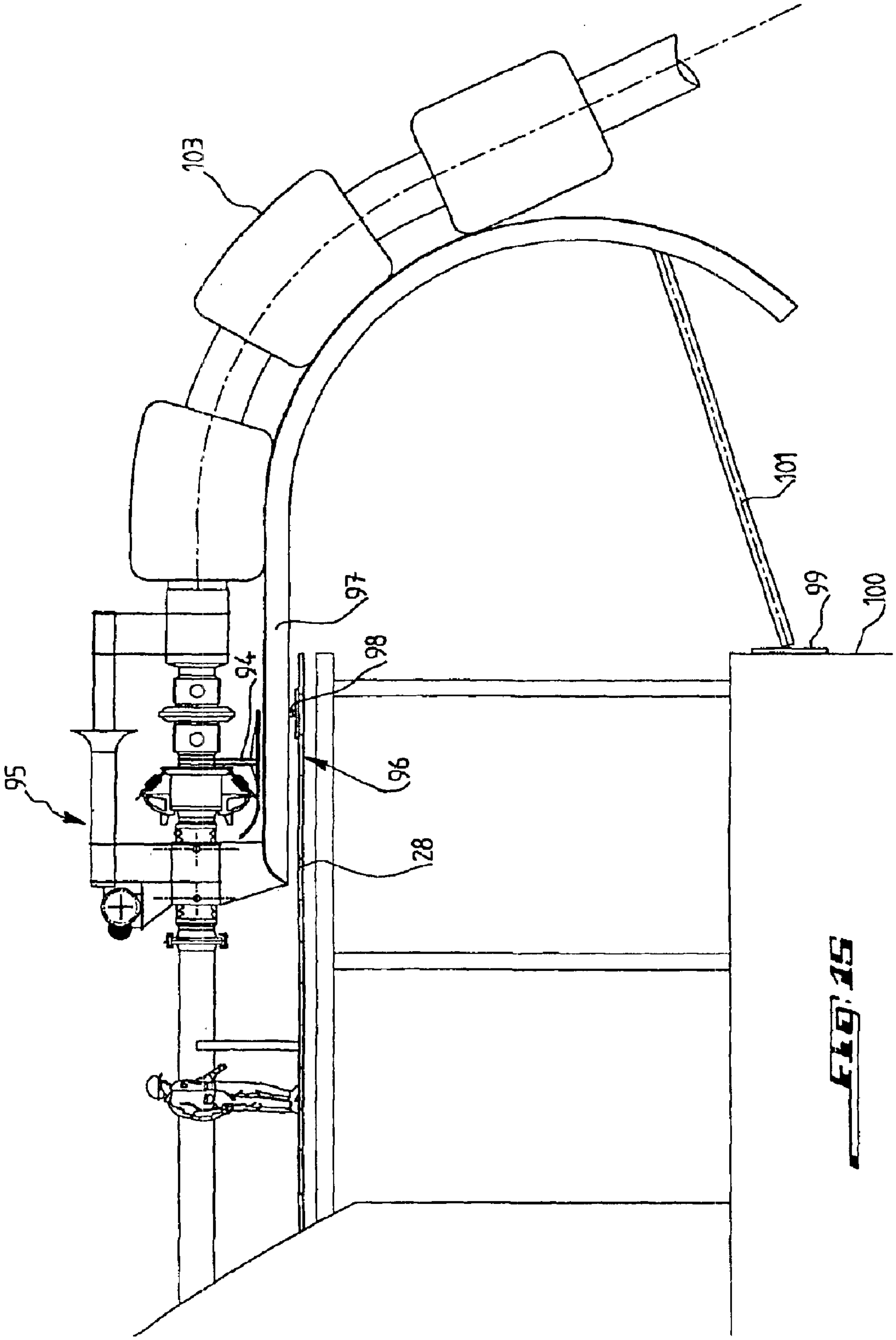
FIG. 15 is an elevation view of a fourth embodiment of a connection module and of one end of the flexible pipe when mutually connected.

FIG. 15 shows a fourth embodiment of the transfer arrangement, in which the interconnection coupler of the module and flexible pipe as well as the emergency disconnector are provided on the flexible pipe side as in the third embodiment. The particularity of the fourth embodiment lies in the fact that the module now denoted 95 is provided with a supporting device 96 made in the form of an arched cradle resting via a foot 98 on the vessel's manifold platform 28 and via a crosspiece 101 and a shoe 99 on the vessel's plating 100. This cradle 97 acts as a guide path on which the end of the flexible pipe leans via several shoes 103 when approaching the connection module. In FIG. 15 three shoes are shown which are axially aligned on the flexible pipe. These shoes provide permanent support for the flexible pipe during transfer. Since it is chiefly the ends of flexible pipes which undergo mechanical stresses, the solution put forward in the fourth embodiment is of great advantage.

Figure 16:
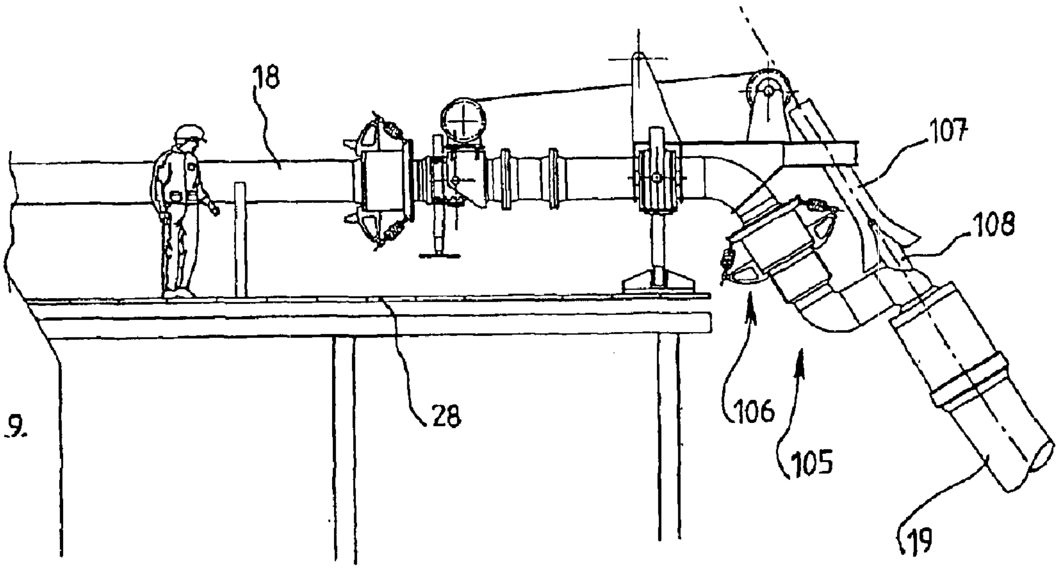
FIG. 16 is an elevation view of a fifth embodiment of a connection module and one end of a flexible pipe shown in the connected state.

FIG. 16 shows a fifth embodiment which is particular in that the part denoted 105 which carries connector 106 of the end of the flexible pipe is offset sideways relative to the axis of the flexible pipe 19 while extending substantially parallel to its axis. On the other hand the trumpet denoted 107 and cone 108 now extend along the axis of the flexible pipe.

Figure 17:
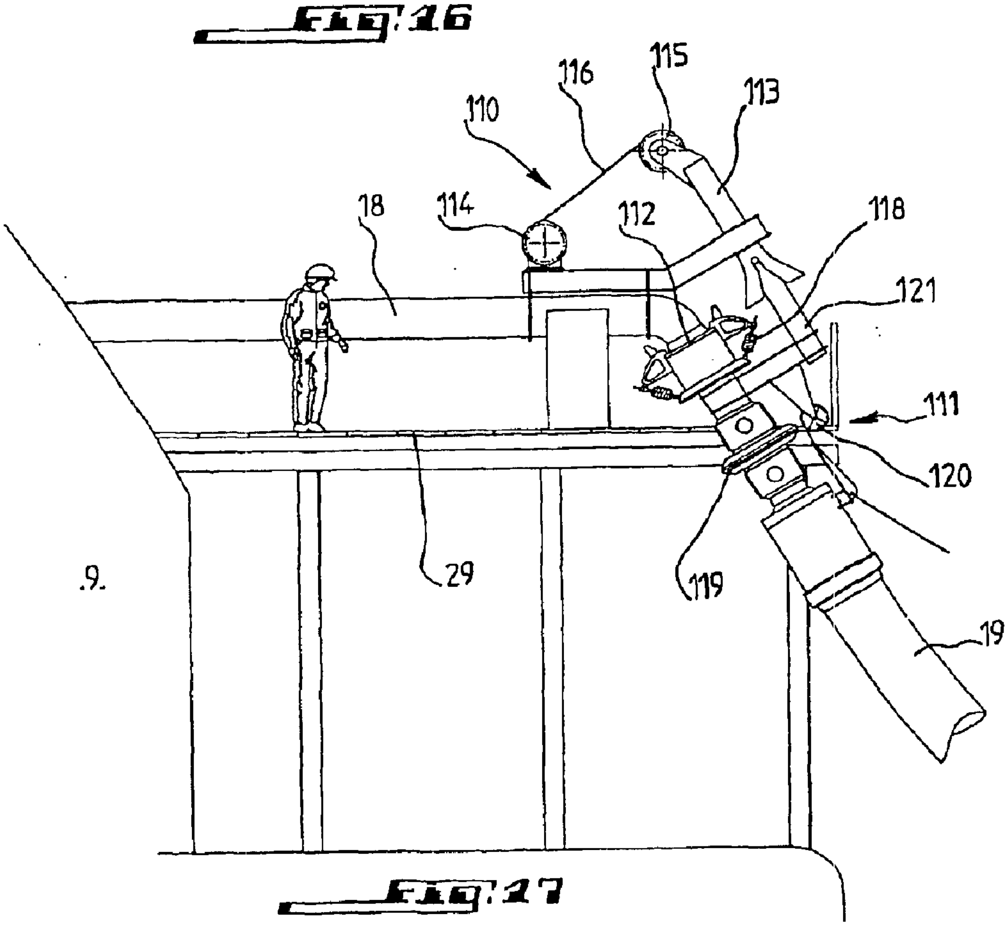
FIG. 17 is an elevation view of a connection device integrated in the manifold and of one end of a flexible pipe shown in the connected state.

FIG. 17 illustrates another possible implementation of the transfer system of the invention whose particular feature is that the part of the connection arrangement of the invention, which in FIG. 11 for example corresponds to the connection module, is now integrated with the end portion denoted 110 of the manifold and it is only the mouthpiece 111 of flexible pipe 19 which can be moved being suspended from gantry 11. Therefore part 111 of the manifold carries the alignment device to fix mouthpiece 111 of the flexible pipe to manifold flange 112, namely the alignment trumpet 113, winch 114 and return pulley 115 of cable 116. Mouthpiece 111 with rectilinear configuration of flexible pipe 19 comprises connector 118, emergency disconnector 119, the fall-braking winch 120 and cone 121.

Finally FIGS. 19 to 22 illustrate another embodiment of the possible implementation of the invention shown in FIG. 17, in which the mouthpiece of the manifold also carries the connector denoted 122 to fix mouthpiece 123 of the flexible pipe to the manifold. The alignment device for mouthpiece 123 when it is being connected to connector 122 has a specific configuration. This device essentially comprises a trumpet 124, a cone 127 associated with mouthpiece 123 of the flexible pipe, two hydraulic jacks 126 pivot-mounted at 128 at diametrically opposite points on the piping part denoted 129, and the winch (not shown) of the cable denoted 131 in the state when it is fixed to the end of the cone. The mouthpiece 123 of the flexible pipe 19 carries two levers 133 which are joint-mounted in diametrically opposite manner on mouthpiece 123 and at its centre of gravity. Each of the pivoting levers is associated with a hydraulic jack 126 so that it can cooperate with the latter as described below. The cone is joint-mounted on the two levers 133 via the crosspiece 134. Each hydraulic jack 126 is provided with a piston rod 136 axially mobile in the outer pivoting tubular body 137. The end of rod 136 carries a fork-piece 138 for grasping the end 139 of a lever 133 of the flexible pipe mouthpiece 123.

FIGS. 23A to 23E show the different phases in the process for connecting the flexible pipe to the manifold. During a first phase shown in FIG. 23A, the cone 127 is drawn into trumpet 124 until the two side blades 55 reach the end of their housing 56 in the front flared part of trumpet 124 as shown in FIG. 23B. The ends are then in the capture zone of fork pieces 138. In this position, the piston rods are allowed to move outwards until the fork pieces 138 engage in the ends 139 of the levers and cause the latter to pivot, which in turn causes mouthpiece 123 of the flexible pipe to move towards the connector at the end of the manifold, in accordance with FIGS. 23C and 23D, until the mouthpiece enters the capture zone of the connector jaws, as shown in FIG. 23E.

Figure 19:
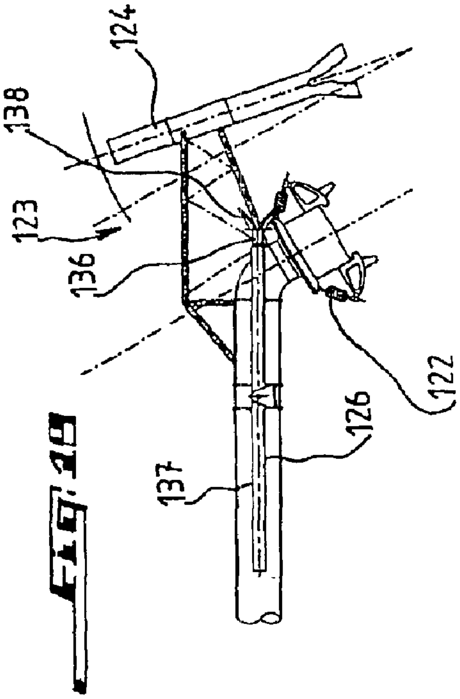
FIG. 19 is an elevation view of a vessel's manifold to which a connection device of the invention is integrated.
Figure 20:
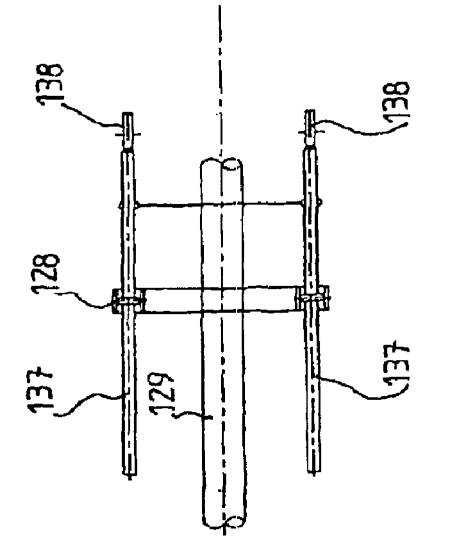
FIG. 20 is a simplified overhead view of the manifold in FIG. 19, the guide and alignment device being omitted.

FIGS. 24 and 25 are elevation views of another version of embodiment of the connection device, that differs from the embodiment in FIG. 19 in that the receiving trumpet 124 for the cone of the mobile part of the flexible pipe is now mounted on its support via a universal joint 140. Jacks 141 commanding the trumpet, when it pivots, enable the nominal positioning and maintained nominal positioning of the trumpet when the cone is positioned in the trumpet.

The implementation modes of this version of embodiment in FIGS. 24 and 25 only differ in the position of the universal joint relative to the trumpet and in the arrangement of the jacks. In the case shown in FIG. 24, the universal joint is at the end of the trumpet, the one opposite the end intended to receive the cone. The jacks are fixed via their body to the support that is integral with the manifold and via the end of their piston rod to a point between the two ends of the trumpet. In the case shown in FIG. 25 the universal joint is positioned at a point between the two ends of the trumpet, advantageously in its median part, while the piston rods are fixed to the trumpet at the end opposite the cone-receiving end.

Concerning the functioning of the embodiment version in FIGS. 24 and 25, this corresponds to the phases shown in FIGS. 23A to 23E. It is to be noted that jacks 141 come into action when the connection between the trumpet and cone is made, that is to say when the cone is fully engaged in the trumpet. This embodiment has the advantage of allowing the trumpet to move freely during the cone engaging phase.

FIG. 26 is an elevation view of yet another embodiment of the connection module. This view is simplified insofar as the guide and alignment device and the trumpet with its support are omitted. The particularity of this embodiment is that the module is fixed to the manifold platform 28 in its position of connection to the manifold flange 18 via clamp devices 142, 143 associated respectively with the adjustable bearer 30 and adjustable foot 35. Therefore, since the module in its connection position is integral with the manifold platform, forces are now fully taken over by this platform. The flexible element such as bellows or piping elements articulated together shown at 145 ensure a flexible connection between connector 19 mounted on the manifold and the piping element of the module.

FIGS. 27 to 30 illustrate yet another embodiment of a transfer system according to the invention. In this embodiment, as in the one shown in FIG. 17, the connection module or device denoted 150 is permanently fixed to manifold 18 thereby displacing the connector to which the flexible pipe is to be connected as far as the edge of the vessel. In other words, the connection device is integrated with the manifold. The integrated connection device rests via a bearer part 155 on the manifold platform 28 at the edge of the vessel. Connector 157 for fixing flexible pipe 19 is oriented downwards. In this embodiment, it is the connector 157 which carries the alignment cone 158 whose axis extends parallel to the connector axis.

As shown in the figures, mouthpiece 160 of flexible pipe 19 is suspended by a cable 162 from a winch 163 positioned at the top of a supporting structure 164 located at a level above the vessel and mounted on a platform 165. The supporting structure may be in any appropriate known form.

Since it is the connector of the fixed module 157 which carries cone 158, in this case, the trumpet 167 receiving this cone is mounted on the mouthpiece 160 of the flexible pipe. This mouthpiece also carries the winch denoted 169 on which cable 170 is coiled so that, after it has been fixed to cone 158, mouthpiece 160 can be fixed to the connection device 150, as can be seen in the figures. In this case the cable passes through the trumpet. Also, the emergency disconnector denoted 172 forms part of mouthpiece 160 of flexible pipe 19.

Figure 28:
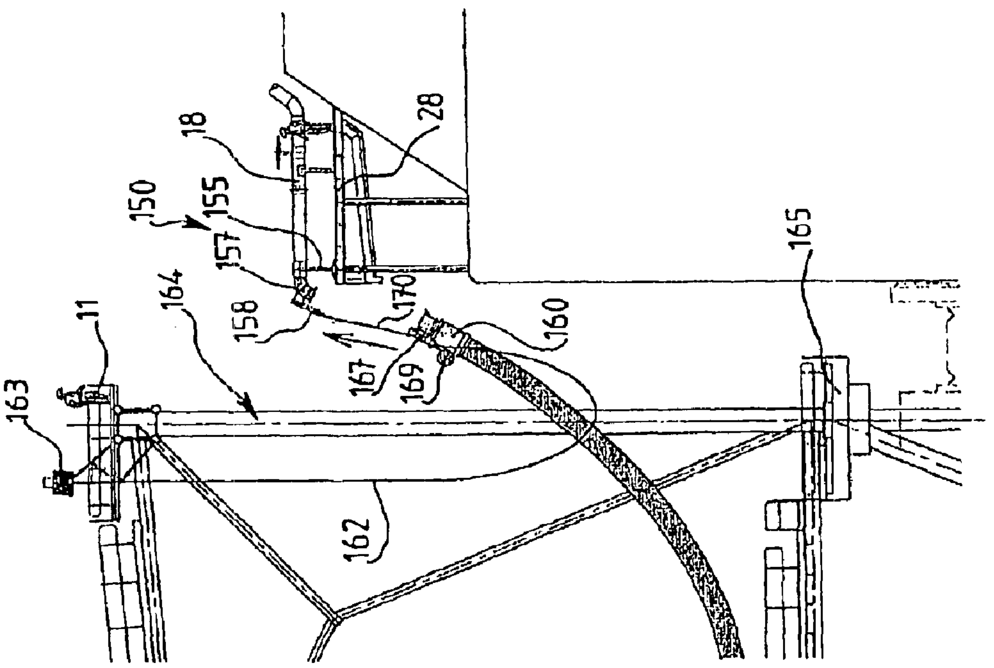
FIG. 28 illustrates a step in the process of setting up a transfer connection for the system in FIG. 27.
Figure 27:
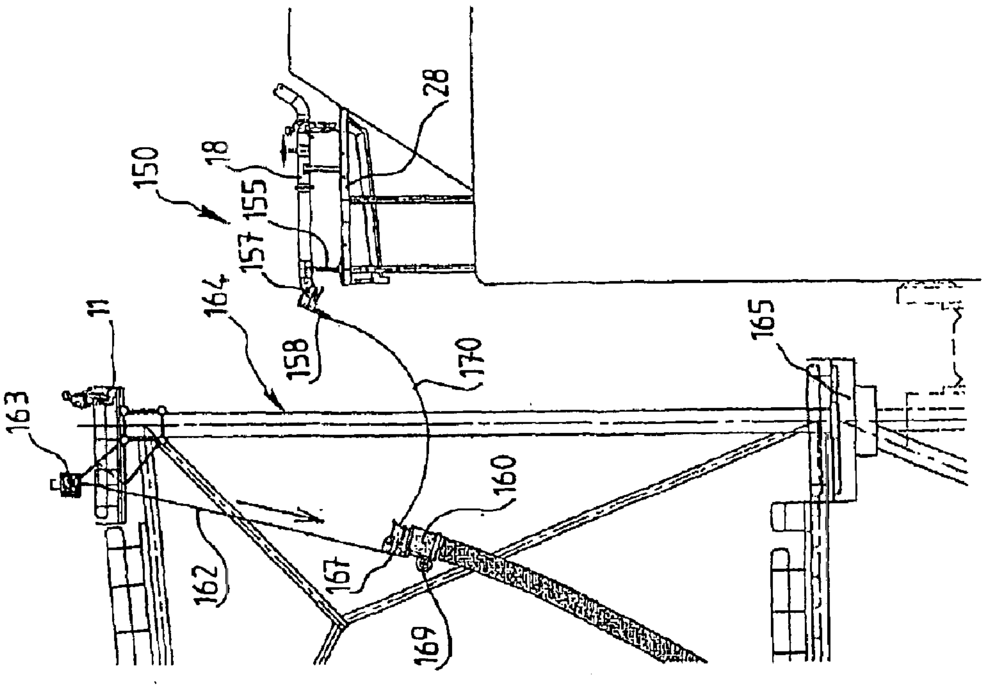
FIG. 27 is an elevation view of yet another embodiment of a transfer system according to the invention.
Figure 30:
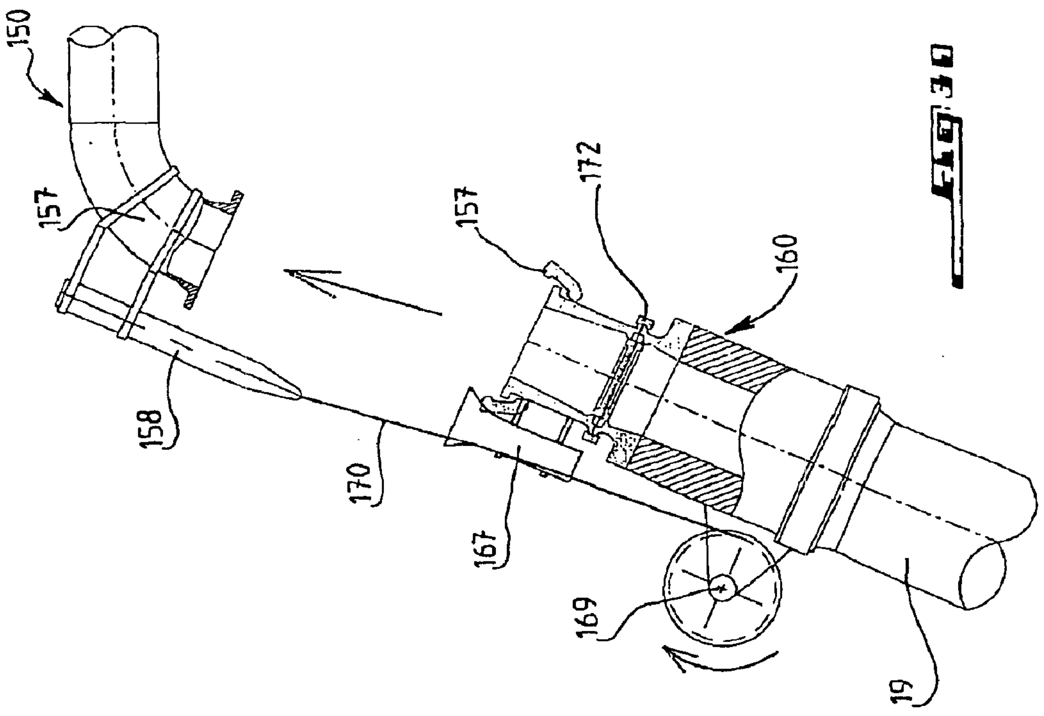
FIG. 30 is a view on a larger scale of the part denoted XXX in FIG. 28.
Figure 29:
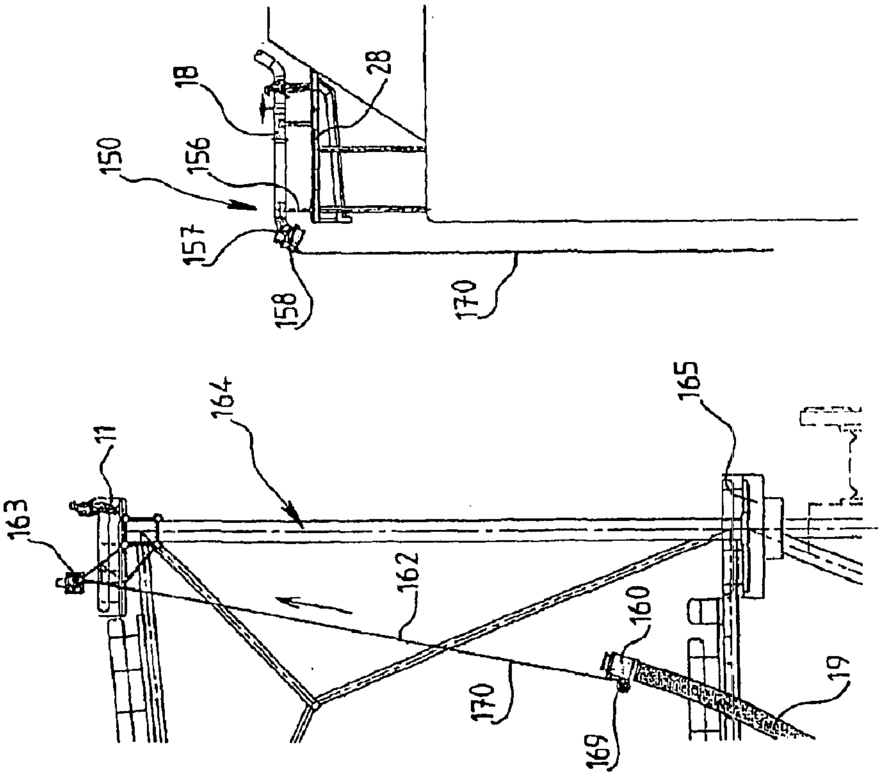
FIG. 29 illustrates a step in the emergency separation process of the transfer system in FIG. 27.

As can be seen in FIGS. 27 and 28, to establish a connection between vessel manifold 18 and flexible pipe 19, mouthpiece 160 of the flexible pipe is lowered by uncoiling cable 162, cable 170 is fixed to cone 158 of the connection module 150 (FIG. 27) and by means of winch 169 the mouthpiece is drawn towards the connection device (FIG. 29) to obtain engagement of the cone in trumpet 167, which enables the mouthpiece to be fixed to the connection device (FIG. 28). FIG. 29, as previously described, shows that during an emergency disconnection, flexible pipe 19 separates itself from the vessel on opening of the emergency disconnector 172 but it is withheld by cable 162, cable 170 after being uncoiled from its winch 169 remaining on that part of the mouthpiece which remains integral with the flexible pipe freely hanging from cone 158. Since connector 157 is at the edge of the vessel, the flexible pipe is not hindered when it separates from the vessel and can move under the effect of its weight without hitting the vessel.

Evidently numerous modifications may be made to the invention as just described and illustrated in the figures, while remaining within the scope of the invention. In the examples of embodiment of the invention, previously given, the transfer station uses cryogenic flexible lines. But these may be replaced by any other flexible item such as a sequence of rigid elements for example articulated with one another.

Evidently all the devices described under a particular embodiment, in particular guide/alignment devices, can be transposed to the other embodiments. In particular it would be possible to use the devices which equip the mobile module in the version integrated with the vessel's manifold and vice-versa.

Figure 18B:
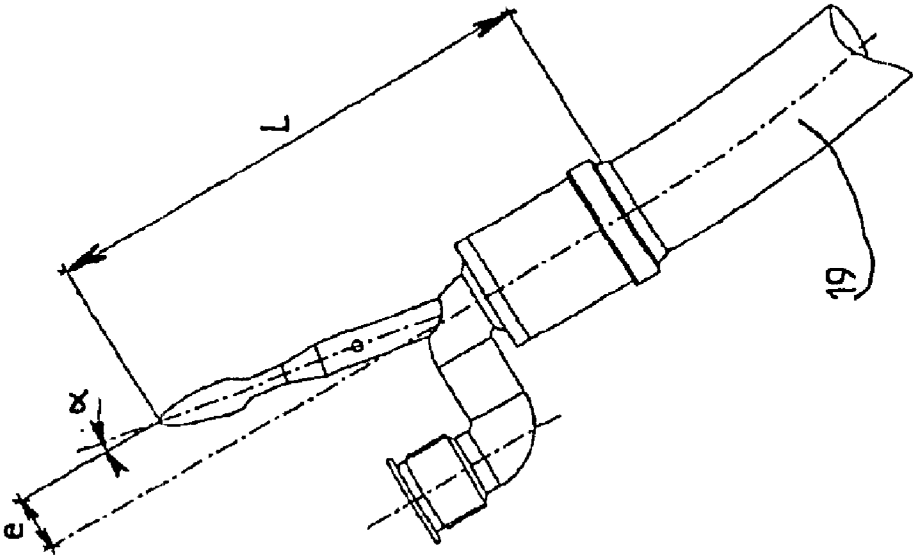
FIGS. 18A and 18B are detailed elevation views of a flexible pipe end of the invention.
Figure 18A:
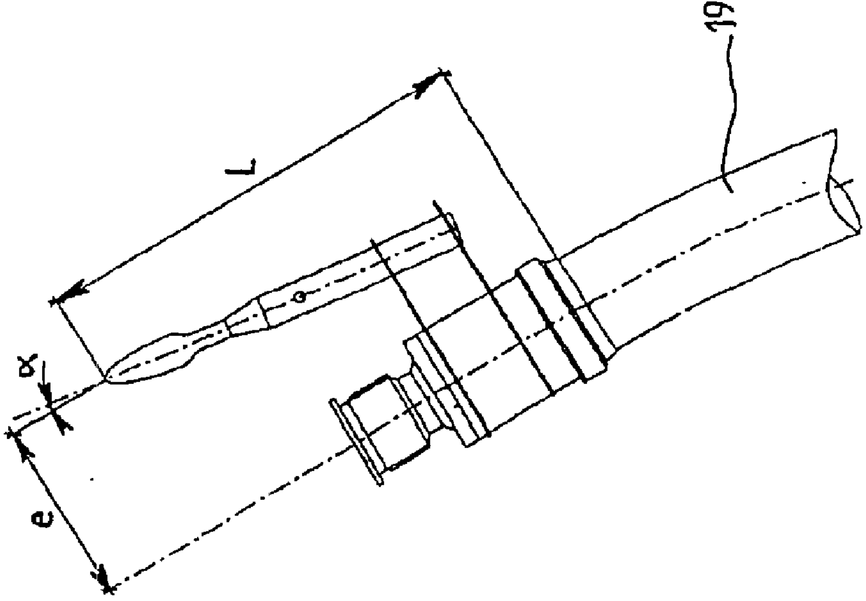
Figure 21:
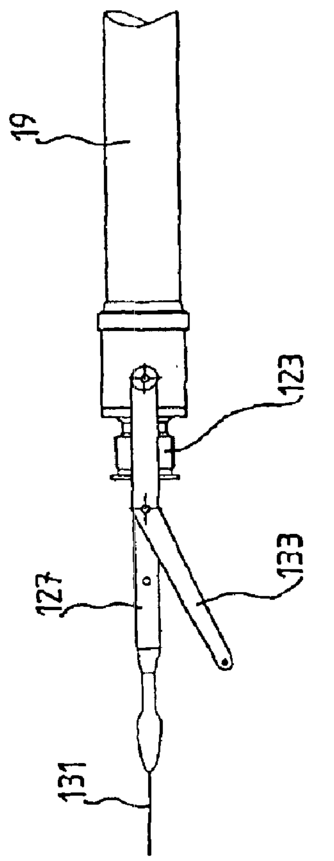
FIG. 21 is an elevation view of a flexible pipe end intended to cooperate with the integrated connection device in FIG. 19.
Figure 22:
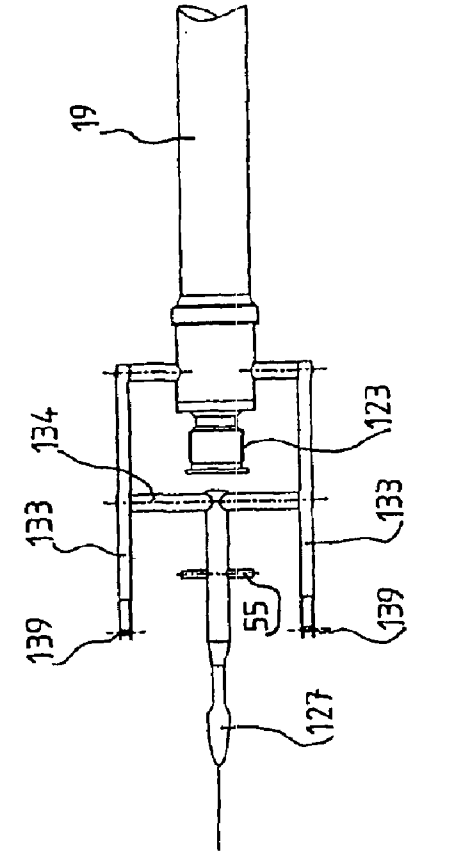
FIG. 22 is an overhead view of the flexible pipe end in FIG. 21.

One characteristic of the invention which is common to all the embodiments lies in the arrangement of the alignment cone. This arrangement is determined in relation to the characteristics of the flexible pipe, in particular in relation to linear weight and stiffness on bending and to the weight of the mouthpiece, so as to minimize stresses in the flexible pipe during all phases and to optimise entry of the cone into the trumpet. FIGS. 18A and 18B illustrate the characteristics of cone arrangement, namely the total length L between the tip of the cone and the base of the mouthpiece, the distance e between the end of the cone and the axis of the flexible pipe, and the angle a between the axis of the cone and the axis of the connector.

It arises from the description and figures that the invention provides numerous major advantages. It is to be noted firstly that the forces produced when setting up a fluid transfer connection, during fluid transfer and during disconnection of transfer parts are fully taken over by the vessel, namely the manifold, the structure of the manifold platform, the vessel plating, etc. Indeed it is the vessel which bears the mobile part and the deformable part of the transfer arrangement of the invention. The manifold flange is the geometric system of reference during all phases of connection, transfer, normal disconnection and emergency disconnection of the flexible pipe. With the module fixed to the flange of the manifold firstly and resting on the vessel platform or plating, it is possible to lift the mobile end of the flexible pipe and to hold it in place by simple winching while limiting shear stresses and induced moments on the manifold flange. The system enables relaxation of heat stresses by constructive measures such as bellows and articulations. Handling of the module by a crane or arm above the manifold platform is simple. The flexible pipes are borne and used in chain configuration, the ideal configuration. The mobile end of the flexible pipe in the event of emergency disconnection may be braked and sensitive parts cannot fall in the water or hit anything.

It is also to be noted that the use of flexible transfer parts such as a flexible cryogenic line makes it possible for the transfer station to absorb even relatively major movements between the vessel and the platforms. By way of example and illustration, that is in no way restrictive, the length of the flexible pipe could be in the order of 50 m or more depending upon these relative movements which are to be absorbed. This leads to considerable advantages such as possible simplification of the vessel mooring structure and the locating of transfer stations even in environments inaccessible to existing transfer stations. Also, on account of the modular structure of the transfer station arrangement according to the invention, the transfer parts can be easily dismounted and transported, which makes it possible to do away with jetties having specific traffic lanes for hoisting vehicles in known transfer systems.

It is also to be noted that the fixing module, both in its independent module version and in its integrated version displaces the connector to which the flexible pipe is to be connected as far as to the side edge of the vessel, which allows the flexible pipe to separate itself from the vessel in the event of emergency disconnection without hitting the vessel and without being damaged. After its separation the flexible pipe remains suspended by its cable connecting it to the supporting structure.

What is claimed is:

1. A system for transferring a fluid product, in particular liquefied natural gas, between a carrying vessel, such as a ship, and an installation, in particular a fixed installation, for processing and storing the fluid product, the system comprising:

a tubular conveying arrangement for conveying the product between the vessel and the installation, having a first end connected to the installation and a second end connectable to a manifold of the vessel, the tubular conveying arrangement including:

a connection device connectable to the manifold of the vessel;

a flexible transfer pipe connected at an end to the installation, the connection device and the flexible transfer pipe being connectable to each other via free ends for transferring the fluid product between the vessel and the installation; and handling means on the free end of the flexible transfer pipe for moving the free end of the flexible transfer pipe between a connection position connected to the connection device and a storage position disconnected from the connection device, the flexible transfer pipe hanging freely between the free end of the flexible transfer pipe and the end of the flexible transfer pipe connected to the installation.

2. The system according to claim 1, wherein the connection device comprises a connection module having handling means enabling movement between the connected position and the storage position, and a bearer device through which the connection module leans on a manifold platform of the vessel when the connection module is in the connection position.

3. The system according to claim 2, wherein the handling means of the connection module is located on a bearing structure, such as a gantry, mounted on a platform device.

4. The system according to claim 3, wherein the handling means on the free end of the flexible transfer pipe comprises a winch and a cable coiled around the winch and having a free end from which the free end of the flexible transfer pipe is suspended.

5. The system according to claim 4, wherein the handling means of the connection module comprises a crane mounted on the bearing structure, from which the module is suspended via a cable.

6. The system according to claim 3, wherein the bearer device for the connection module on the vessel is an adjustable bearer connected to the connection module via an articulation having a horizontal axis.

7. The system according to claim 1 comprising a fall-braking device for braking falling of the free end of the flexible transfer pipe in an emergency disconnection.

8. The system according to claim 1, wherein the connection device comprises a guide device for guiding the free end of the flexible transfer pipe towards a receiving end on the connection device.

9. The system according to claim 8, wherein the receiving end of the connection device has an axis oblique to the vertical for connection of the free end of the flexible transfer pipe to the receiving end through the guide device.

10. The system according to claim 1, wherein the connection device is integrated at an end of the manifold of the vessel.

11. The system according to claim 10, wherein the flexible transfer pipe hangs freely between the free end of the flexible transfer pipe and the end of the flexible transfer pipe connected to the installation.

12. The system according to claim 1, wherein the flexible transfer pipe is a flexible cryogenic line.

13. The system according to claim 1, wherein the flexible transfer pipe is a succession of parts articulated with one another.

14. The system according to claim 1, wherein a fixed end of the flexible transfer pipe is permanently fixed by a bearing structure, such as a gantry, mounted on a platform.

15. The system according to claim 14, wherein the bearing structure comprises equipment to connect the flexible transfer pipe to immersed cryogenic lines of a shore installation.

16. A system for transferring a fluid product, in particular liquefied natural gas, between a carrying vessel, such as a ship, and an installation, in particular a fixed installation, for processing and storing the fluid product, the system comprising:

a tubular conveying arrangement for conveying the product between the vessel and the installation, having a first end connected to the installation and a second end connectable to a manifold of the vessel, the tubular conveying arrangement including:

a connection device connectable to the manifold of the vessel;

a flexible transfer pipe connected at an end to the installation, the connection device and the flexible transfer pipe being connectable to each other via free ends for transferring the fluid product between the vessel and the installation; and handling means on the free end of the flexible transfer pipe for moving the free end of the flexible transfer pipe between a connection position connected to the connection device and a storage position disconnected from the connection device, wherein the connection device comprises a connection module having handling means enabling movement between the connected position and the storage position, and a bearer device through which the connection module leans on a manifold platform of the vessel when the connection module is in the connection position.

17. The system according to claim 16, wherein the tubular conveying arrangement comprises an emergency disconnection device for the flexible transfer pipe.

18. The system according to claim 17, wherein the emergency disconnection device for the flexible transfer pipe is located in the connection module.

19. The system according to claim 17, wherein the emergency disconnection device is located on the free end of the flexible transfer pipe.

20. The system according to claim 16, wherein the connection module comprises a bellows joint device making the connection module isostatic when connected to the manifold of the vessel, and supported by the manifold platform.

21. The system according to claim 16, wherein the flexible transfer pipe hangs freely, like a chain, between the free end of the flexible transfer pipe and the end of the flexible transfer pipe connected to the installation.

22. The system according to claim 21, wherein the flexible transfer pipe hangs freely, like a chain, between the free end of the flexible transfer pipe and the end of the flexible transfer pipe connected to the installation, in all working situations.

23. A system for transferring a fluid product, in particular liquefied natural gas, between a carrying vessel, such as a ship, and an installation, in particular a fixed installation, for processing and storing the fluid product, the system comprising:

a tubular conveying arrangement for conveying the product between the vessel and the installation, having a first end connected to the installation and a second end connectable to a manifold of the vessel, the tubular conveying arrangement including:

a connection device connectable to the manifold of the vessel;

a flexible transfer pipe connected at an end to the installation, the connection device and the flexible transfer pipe being connectable to each other via free ends for transferring the fluid product between the vessel and the installation;

handling means on the free end of the flexible transfer pipe for moving the free end of the flexible transfer pipe between a connection position connected to the connection device and a storage position disconnected from the connection device; and a fall-braking device for braking falling of the free end of the flexible transfer pipe in an emergency disconnection.

24. The system according to claim 23, wherein the fall-braking device comprises a winch located on one of (i) a part which remains connected to the manifold of the vessel in an emergency disconnection and (ii) the free end of the flexible transfer pipe, and around which a cable is coiled, the cable having a free end fixed to one of (i) the free end of the flexible transfer pipe and (ii) the part which remains connected to the manifold in an emergency disconnection, the cable disconnecting itself in an emergency disconnection.

25. A system for transferring a fluid product, in particular liquefied natural gas, between a carrying vessel, such as a ship, and an installation, in particular a fixed installation, for processing and storing the fluid product, the system comprising:

a tubular conveying arrangement for conveying the product between the vessel and the installation, having a first end connected to the installation and a second end connectable to a manifold of the vessel, the tubular conveying arrangement including:

a connection device connectable to the manifold of the vessel;

a flexible transfer pipe connected at a first end to the installation, the connection device and the flexible transfer pipe being connectable to each other via free ends for transferring the fluid product between the vessel and the installation; and handling means on the free end of the flexible transfer pipe for moving the free end of the flexible transfer pipe between a connection position connected to the connection device and a storage position disconnected from the connection device, wherein the connection device comprises a device for guiding the free end of the flexible transfer pipe towards a receiving end on the connection device.

26. The system according to claim 25, wherein the guide device comprises a trumpet on the connection device or on a mouthpiece of the flexible transfer pipe, and a cone on the free end of the flexible transfer pipe or on the connection device, and means for engaging the cone in the trumpet when connecting the flexible transfer pipe to the connection device.

27. The system according to claim 26, comprising a winch on the connection device or the free end of the flexible transfer pipe, and a cable coiling around the winch and having a free end attachable to the cone.

28. The system according to claim 27 comprising a fall-braking device for braking falling of the free end of the flexible transfer pipe in an emergency disconnection, the fall-breaking device comprising the winch and the cable, wherein the cable is fixed to the free end of the flexible transfer pipe or to the connection device.

* * * * *